United States Patent [19]

Tsutsui et al.

[11] Patent Number: 5,680,130
[45] Date of Patent: Oct. 21, 1997

[54] INFORMATION ENCODING METHOD AND APPARATUS, INFORMATION DECODING METHOD AND APPARATUS, INFORMATION TRANSMISSION METHOD, AND INFORMATION RECORDING MEDIUM

[75] Inventors: Kyoya Tsutsui; Osamu Shimoyoshi, both of Kanagawa; Mito Sonohara, Tokyo, all of Japan

[73] Assignee: Sony Corporation, Tokyo, Japan

[21] Appl. No.: 553,449

[22] PCT Filed: Mar. 31, 1995

[86] PCT No.: PCT/JP95/00635

§ 371 Date: Nov. 17, 1995

§ 102(e) Date: Nov. 17, 1995

[87] PCT Pub. No.: WO95/27335

PCT Pub. Date: Oct. 12, 1995

[30] Foreign Application Priority Data

Apr. 1, 1994 [JP] Japan ................... 6-064853
Apr. 1, 1994 [JP] Japan ................... 6-064854

[51] Int. Cl.$^6$ .................................................. H03M 7/30
[52] U.S. Cl. ............................ 341/87; 341/50; 341/51; 395/2.92
[58] Field of Search .................... 341/50, 51, 87; 395/2.92, 2.15

[56] References Cited

U.S. PATENT DOCUMENTS

| | | | |
|---|---|---|---|
| 4,485,337 | 11/1984 | Sandusky | 318/314 |
| 4,669,120 | 5/1987 | Ono | 381/40 |
| 4,908,810 | 3/1990 | Oie | 369/50 |
| 4,972,484 | 11/1990 | Theile | 381/37 |
| 5,040,217 | 8/1991 | Brandenburg | 381/47 |
| 5,045,812 | 9/1991 | Tateishi | 331/10 |
| 5,063,550 | 11/1991 | Watari et al. | 369/44.36 |
| 5,109,417 | 4/1992 | Fielder | 381/36 |
| 5,204,677 | 4/1993 | Akagiri et al. | 341/118 |
| 5,301,205 | 4/1994 | Tsutsui et al. | 375/1 |
| 5,311,561 | 5/1994 | Akagiri | 375/122 |
| 5,355,430 | 10/1994 | Huff | 395/2.32 |
| 5,440,584 | 8/1995 | Wiese | 375/242 |
| 5,537,510 | 7/1996 | Kim | 395/2.38 |
| 5,581,653 | 12/1996 | Todd | 395/2.38 |

FOREIGN PATENT DOCUMENTS

WO94/28633  12/1994  WIPO ................ H03M 7/30

OTHER PUBLICATIONS

Patent Abstract of Japan, vol. 14, No. 525 (P-1132) Nov. 19, 1990 & JP-A-22 20 271 (Pioneer Electronic Corporation) Sep. 3, 1990 *abstract*.

*Primary Examiner*—Brian K. Young
*Assistant Examiner*—Jason L. W. Kost
*Attorney, Agent, or Firm*—Limbach & Limbach L.L.P.

[57] ABSTRACT

According to the present invention, for encoding input signals, the input signals are transformed into frequency components, and the frequency components are separated into a first signal composed of tonal components and a second signal composed of other components. The first and second signals are encoded respectively, and code strings for transmission or recording are generated on the basis of encoded signals resulting from first and second encoding. For example, only the first signal is encoded and the code string is caused to include partial information strings grouped so as to have common values on the basis of at least one of reference parameters pertaining to the signal separation and parameters pertaining to the first encoding. Thus, more efficient encoding than in the conventional technique can be realized.

36 Claims, 15 Drawing Sheets

INFORMATION ENCODING METHOD AND APPARATUS, INFORMATION DECODING METHOD AND APPARATUS, INFORMATION TRANSMISSION METHOD, AND INFORMATION RECORDING MEDIUM

TECHNICAL FIELD

This invention relates to an information encoding method and apparatus for encoding information such as input digital data by high efficiency encoding, an information decoding method and apparatus for decoding encoded information, an information transmission method for transmitting encoded information, and an information recording medium in which encoded information is recorded.

BACKGROUND ART

There exist a variety of high efficiency encoding techniques of audio or speech signals. Examples of these techniques include transform coding in which a frame of digital signals representing the audio signal on the time axis is converted by an orthogonal transform into a block of spectral coefficients representing the audio signal on the frequency axis, and a sub-band coding (SBC) in which the frequency band of the audio signal is divided by a filter bank into a plurality of sub-bands without forming the signal into frames along the time axis prior to coding. There is also known a combination of sub-band coding and transform coding, in which signals representing the audio signal on the time axis are divided into bands by band division and are then transformed into signals on the frequency axis by spectral transform, and frequency components obtained by the spectral transform are encoded each band.

Among the filters for dividing a frequency spectrum into a plurality of equal-width frequency ranges include the quadrature mirror filter (QMF) as discussed in R. E. Crochiere, Digital Coding of Speech in Sub-bands, 55 Bell Syst. Tech. J. No.8 (1978). With the QMF filter, the frequency spectrum of the signal is divided into two equal-width bands. With the QMF, aliasing is not produced when the frequency bands resulting from the division are subsequently combined together.

In "Polyphase Quadrature Filters—A New Subband Coding Technique", Joseph H. Rothweiler ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the digital input audio signal into frames of a predetermined time duration, and processing the resulting frames using a discrete Fourier transform (DFT), discrete cosine transform (DCT) and modified DCT for converting the signal from the time axis to the frequency axis. Discussions on MDCT may be found in J. P. Princen and A. B. Bradley, Subband Transform Coding Using Filter Bank Based on Time Domain Aliasing Cancellation", ICASSP 1987.

By quantizing the signals divided on the band basis by the filter or spectrum conversion, it becomes possible to control the band subjected to quantization noise and psychoacoustically more efficient coding may be achieved by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use sub-bands that take advantage of the psychoacoustic characteristics of the human auditory system. That is, spectral coefficients representing an audio signal on the frequency axis may be divided into a plurality of critical frequency bands, for example 25 critical bands. The width of the critical bands increase with increasing frequency. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantized using an adaptively allocated number of bits.

There are presently known the following two bit allocation techniques. For example, in IEEE Transactions of Acoustics, Speech and Signal Processing, vol. ASSP-25, No.4, August 1977, bit allocation is carried out on the basis of the amplitude of the signal in each critical band. This technique produces a flat quantization noise spectrum and minimizes noise energy, but the noise level perceived by the listener is not optimum because the technique does not effectively exploit the psychoacoustic masking effect.

In the bit allocation technique described in M. A. Krassner, The Critical Band Encoder—Digital Encoding of the Perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a sine wave, non-optimum results are obtained because of the fixed allocation of bits among the critical bands.

For overcoming these inconveniences, a high efficiency encoding apparatus has been proposed in which the total number of bits available for bit allocation is divided between a fixed bit allocation pattern pre-set for each small block and a block-based signal magnitude dependent bit allocation, and the division ratio is set in dependence upon a signal relevant to the input signal, such that, the smoother the signal spectrum, the higher becomes the division ratio for the fixed bit allocation pattern.

With this apparatus, if the energy is concentrated in a particular spectral component, as in the case of a sine wave input, a larger number of bits are allocated to the block containing the spectral component for significantly improving the signal-to-noise ratio characteristics on the whole. Since the human auditory system is highly sensitive to a signal having acute spectral components, such technique may be employed for improving the signal-to-noise ratio for improving not only measured values but also the quality of the sound as perceived by the ear.

In addition to the above techniques, a variety of other techniques have been proposed, and the model simulating the human auditory system has been refined, such that, if the encoding device is improved in its ability, the encoding may be made with higher efficiency in light of the human auditory system.

FIG. 1 shows a basic constitution of a conventional encoding device for encoding acoustic signals as waveform signals on the time axis.

Referring to FIG. 1, the acoustic signal waveform supplied at a terminal 100 is converted by a conversion circuit 101 into frequency components of acoustic signals which are then encoded by a signal component encoding circuit 102. The codes are arrayed by a code string generating circuit 103 as a code string which is outputted at a terminal 104.

FIG. 2 shows an illustrative constitution of the conversion circuit 101 shown in FIG. 1.

Referring to FIG. 2, the acoustic signal supplied at a terminal 200, corresponding to the terminal 100 shown in FIG. 2, is divided into four bands by a frequency spectrum dividing circuit 201 which may be the aforementioned polyphase quadrature filter. The acoustic signals of the respective bands, obtained by the frequency spectrum dividing filter 201, are converted into spectral components by forward orthogonal conversion circuits 211 to 214 for effectuating an orthogonal transform, such as MDCT circuits. That is, the acoustic signals inputted to the forward spectrum conversion circuits 211 to 214 are each of a bandwidth equal to one-fourth of the bandwidth of the signal supplied at the terminal 200, such that the acoustic signals supplied via the terminal 200 are sub-sampled at a rate of 1 to 4. Outputs of the forward spectrum conversion circuits 211 to 214 are fed via terminals 221 to 224 to the signal component encoding circuit 102 shown in FIG. 1.

Of course, the conversion circuit 101 shown in FIG. 1 may be modified in desired manner. For example, the input acoustic signal may be directly converted by MDCT into spectral components, while MDCT may be replaced by DFT or DCT.

FIG. 3 shows an illustrative constitution of the signal component encoding circuit 102 shown in FIG. 1.

Referring to FIG. 3, an output of the signal component encoding circuit 102 supplied to a terminal 300 is normalized by a normalizing circuit 301 on the band basis before being transmitted to a quantization circuit 303. The input signal to the terminal 300 is also fed to a quantization step decision circuit 302. The quantization circuit 303 quantizes the normalized spectral components from the normalizing circuit 301 based on the quantization steps as calculated by the quantization step decision circuit 303 from the spectral components supplied via the terminal 300. The quantized spectral components from the quantization circuit 303 are fed via the terminal 304 to the code string generating circuit 103 of FIG. 1. A signal outputted via the terminal 304 contains the normalization coefficient information in the normalization circuit 301 and the quantization step information in the decision circuit 302, in addition to the quantized spectral components from the quantization circuit 303.

FIG. 4 shows a basic constitution of a signal decoding device for decoding the acoustic signal from the code string generated by the coding device shown in FIG. 1, and outputting the decoded acoustic signal.

Referring to FIG. 4, the codes of the respective signal components are extracted by a signal string resolution circuit 401 from the code string generated by the constitution shown in FIG. 1 and supplied via a terminal 400. From these codes, the signal components are restored by the signal component decoding circuit 402. The decoded signal components are processed by an inverse-transform circuit 403 with inverse-transform which is an inverse operation of that executed by the transform circuit 101 of FIG. 1. This produces an acoustic waveform signal which is outputted at a terminal 404.

FIG. 5 shows an illustrative constitution of an inverse transform circuit 403 shown in FIG. 4.

FIG. 5 shows an illustrative constitution of a counterpart circuit of the transform circuit shown in FIG. 2. The signals supplied from the signal component decoding circuit 402 via terminals 501 to 504 are processed by inverse spectrum conversion circuits 511 to 514 which execute inverse spectrum transform which is the reverse of the forward spectrum transform shown in FIG. 2. The signals of the respective bands produced by the inverse orthogonal transform circuits 511 to 514 are combined by a band combining filter 515 which executes an operation which is the reverse of the frequency spectrum division preformed by the frequency spectrum division filter 201 shown in FIG. 2. An output of the band synthesizing filter 515 is outputted at a terminal 521 corresponding to the terminal 404 shown in FIG. 4.

FIG. 8 illustrates an example of a conventional encoding method. In the example shown in FIG. 8, the spectral component signals are those produced by the transform circuit shown in FIG. 2. In FIG. 6, the levels of absolute values of the spectral signals by MDCT as shown after conversion to corresponding dB values.

In FIG. 6, the input signal is transformed into 64 spectral signals from one pre-set time block to another. These 64 spectral signals are grouped into five pro-set bands, referred to herein as encoding units $b_1$ to $b_5$ in FIG. 6, so as to be normalized and quantized on the encoding group basis. The bandwidths of the respective encoding units $b_1$ to $b_5$ are narrower towards the low range and broader towards the high range in order to permit the control of the generation of the quantization noise conforming to the characteristics of the human auditory system.

However, as may be seen from FIG. 6, if the normalization is effectuated for each of pre-set bands, signal normalization in the encoding unit b3 containing tonal components is executed on the basis of a larger normalization coefficient value as determined by the tonal components. Using this normalization coefficient value, all the spectral components contained in the encoding unit $b_3$ are normalized. The noise contained in the tonal acoustic signal is obstructive to the ear. In addition, if the tonal components are not quantized with high accuracy, considerable connection distortion is produced when the tonal components are synthesized with the waveform signals of the neighboring time block. For this reason, the tonal component needs to be quantized with a sufficient number of bits. However, if the quantization step is determined based on pre-set frequency bands, it is necessary to allocate a larger number of bits to a large number of the spectral components in the encoding unit containing the tonal components, thus lowering the coding efficiency.

With the above-described conventional method, the frequency bands for quantization of the frequency components with the same quantization step are fixed. Fir this reason, if the spectral components are concentrated near several specified frequencies, and if these spectral components are to be quantized with sufficiently fine quantization steps, it is necessary to allocate a large number of bits to a large number of spectral components belonging to the same band as that of the spectral components.

In general, the noise contained in the tonal acoustic signal in which the spectral energy is concentrated at specified frequencies is more offensive to the ear than the noise contained in the acoustic signal in which the energy is smoothly distributed over a wide frequency range. Such noise is extremely objectionable to the ear. On the other hand, if the spectral components having larger energies, that is tonal components, are not quantized with sufficiently fine quantization steps, block-to-block distortion becomes larger when the spectral components are restored to the waveform signals on the time axis and the resulting waveform signals are synthesized with temporally neighboring blocks. In other words, larger connection distortion is produced when the resulting waveform signals are synthesized with the waveform signals of the neighboring temporal blocks, thus again presenting hindrance to the human auditory system. Thus it has been difficult with the conventional method to raise the coding efficiency for the tonal acoustic signal without deteriorating the signal quality.

In order to obviate such inconvenience, the present Assignee proposed in International Filing No. PCT/JP94/00880 (International Publication No. WO94/28633, International Publication Date Dec. 8, 1994) a method for realizing high encoding efficiency by separating the input signal into tonal components in which the signal energy is concentrated in a specified frequency and non-tonal components in which the signal energy is smoothly distributed over a broad frequency range.

With the previously proposed method, the encoding may be achieved more efficiently than with the above-mentioned method of quantizing the frequency components based on fixed bands by quantizing the tonal components with fine quantization steps within an extremely narrow range on the frequency axis and by recording the resulting data on the recording medium along with the position on the frequency axis. As an illustrative example of the high efficiency encoding, a method was proposed for normalizing and quantizing a pre-set number of spectral signals centered about a maximum energy spectral component of each of the tonal components, and encoding the resulting spectral signals.

However, the method as proposed in PCT/JP94/00880 consists in according the information concerning the quantization steps for quantizing the tonal components to each tonal component or quantizing all of the tonal components wit the same quantization steps. If the former method is employed, it is necessary to use a large number of bits for encoding the information on the same quantization steps, which is not desirable for realizing high efficiency coding. On the other hand, if the latter method is utilized, the quantization steps cannot be set to optimum values for the respective tonal components.

It is therefore a principal object of the present invention to provide an information encoding method and apparatus, an information decoding method and apparatus, an information transmission method and an information recording medium, whereby the tonal acoustic signals, above all, can be encoded efficiently and the quantization steps can be optimally set for the respective tonal components.

DISCLOSURE OF THE INVENTION

The present invention provides an information encoding method for encoding an input signal which includes the steps of transforming the input signal into frequency components, separating the frequency components into a first signal composed of tonal components and a second signal composed of non-tonal components, encoding said first signal by way of first encoding, encoding the second signal by way of second encoding, and generating a code string for transmission or recording based on encoded signals produced by the first encoding and the second encoding. The code string contains partial information strings grouped so as to have common values on the basis of at least one of reference parameters pertaining to signal separation and parameters pertaining to the first encoding.

The present invention also provides an information transmission method for transmitting an encoded signal generated by transforming the input signal into frequency components, separating the frequency components into a first signal composed of tonal components and a second signal composed of nn-tonal components, and encoding the first and second signals. The transmitting method includes the steps of transmitting a first code string corresponding to the first signal, and transmitting a second code string corresponding to the second signal. The first code string contains partial information strings grouped so as to have common values on the basis of at least one of reference parameters pertaining to signal separation and parameters pertaining to the first encoding.

The present invention also provides an information decoding method for decoding a code string composed of encoded signals. The decoding method includes the steps of decoding an encoded signal corresponding to a first signal made up of tonal components for generating first decoded signals by way of first decoding, decoding an encoded signal corresponding to a second signal made up of non-tonal components for generating second decoded signals by way of second decoding, and synthesizing the first and second decoded signals for restoring an original signal. The first decoding or the restoring exploits a sole parameter for decoding or restoring.

The present invention also provides an information encoding apparatus for encoding an input signal having means for transforming the input signal into frequency components, means for separating the frequency components into a first signal composed of tonal components and a second signal composed of non-tonal components, means for encoding the first signal by way of first encoding, encoding the second signal by way of second encoding, and means for generating a code string for transmission or recording based on encoded signals produced by the first encoding and the second encoding. The code string includes partial information strings grouped so as to have common values on the basis of at least one of reference parameters pertaining to signal separation and parameters pertaining to the first encoding.

The present invention provides an information recording medium having recorded thereon encoded signals generated by transmitting an encoded signal generated by transforming the input signal into frequency components, separating the frequency components into a first signal composed of tonal components and a second signal composed of non-tonal components, and encoding the first and second signals. A first code string corresponding to the first signal and a second code string corresponding to the second signal are recorded separately from each other. The code string includes partial information strings grouped so as to have common values on the basis of at least one of reference parameters pertaining to signal separation and parameters pertaining to the first encoding.

The present invention further provides an information decoding apparatus for decoding a code string composed of encoded signals. The decoding apparatus has means for decoding an encoded signal corresponding to a first signal made up of tonal components for generating first decoded signals by way of first decoding, means for decoding an encoded signal corresponding to a second signal made up of non-tonal components for generating second decoded signals by way of second decoding, and means for synthesizing the first and second decoded signals for restoring an original signal. The first decoding or the restoring employs a sole parameter for decoding or restoring.

With the information encoding method and apparatus according to the present invention, high efficiency encoding may be achieved by classifying the first signal as the tonal components into partial information strings in accordance with the common information, not coding void ones of the partial information strings, and by jointly encoding the information indicating the encoded partial information strings, that is by separating the tonal components into groups, not encoding the groups not containing the tonal components and encoding the number of the encoded groups.

With the information transmission method and the information recording medium according to the present invention, efficient transmission may be achieved by transmitting the information encoded by the information encoding method and apparatus according to the present invention.

With the decoding method and apparatus according to the present invention, the information indicating the encoded partial information strings excepting the non-encoded void partial information strings are decoded and, based on the decoded results, decoding is made of the partial information strings consisting in the first signal of the tonal components classed in accordance with the common information.

BEST MODE FOR CARRYING OUT THE INVENTION

Figure 1:
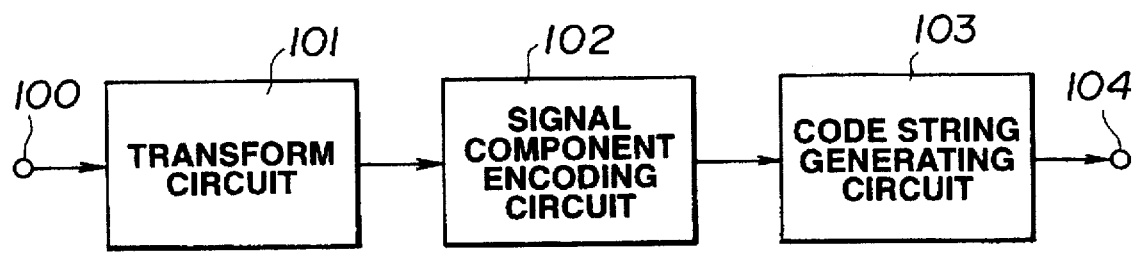
FIG. 1 is a block diagram showing a basic arrangement of a conventional encoding apparatus.

Referring to the drawings, preferred illustrative embodiments of the present invention will be explained in detail.

Figure 7:
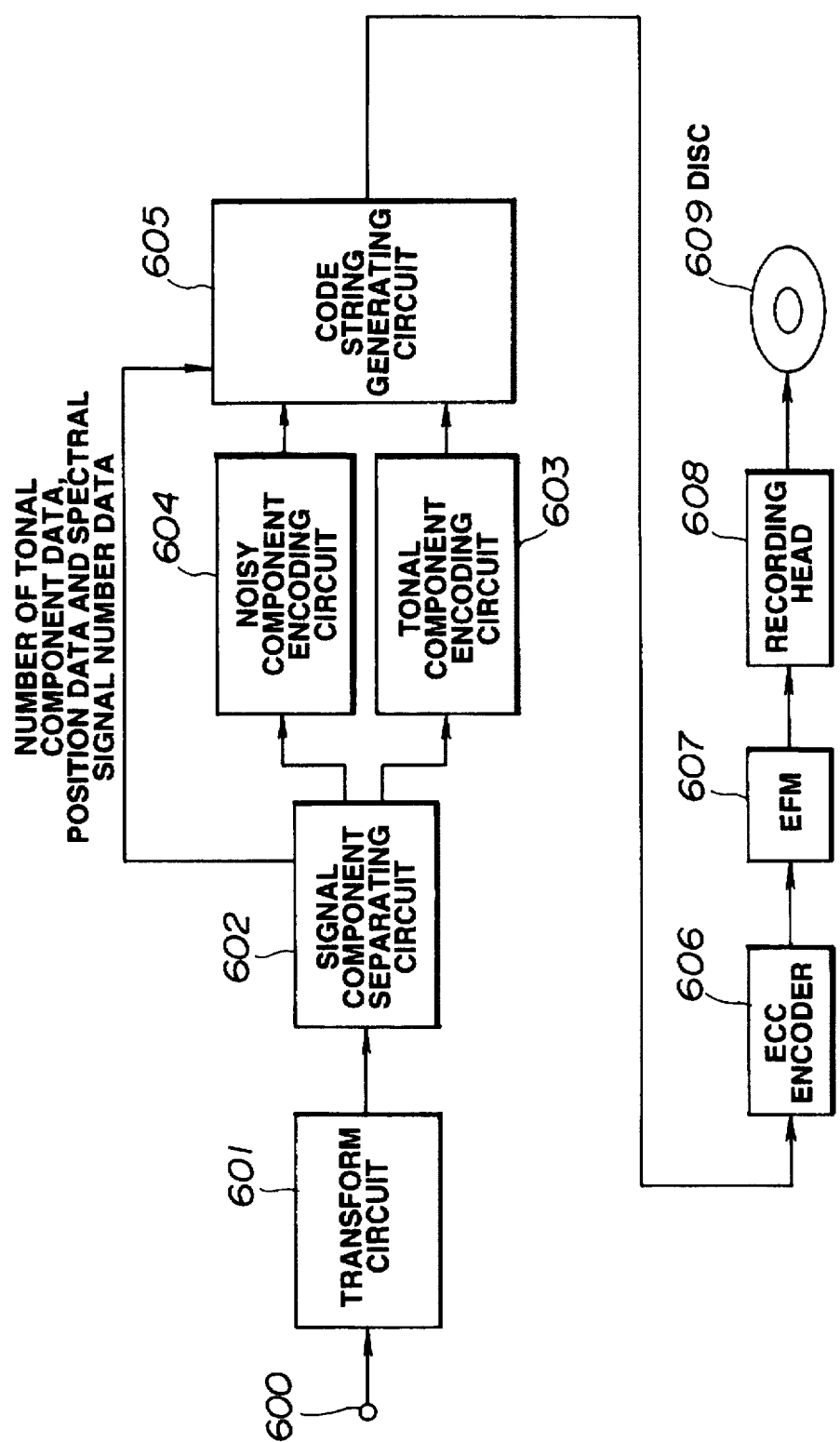
FIG. 7 is a block diagram showing an arrangement of an information encoding apparatus embodying the present invention.

FIG. 7 shows an arrangement of an information encoding apparatus embodying the present invention.

Referring to FIG. 7, an acoustic waveform signal is supplied at a terminal 600. The acoustic waveform signal is transformed by a transform circuit 601 into signal frequency components, which are then routed to a signal component separating circuit 602. In the signal component separating circuit 602, the signal frequency components produced by the transform circuit 601 are separated into tonal components having a steep spectral distribution and remaining signal frequency components, that is noisy components having a flat spectral distribution. Of the resulting frequency components, the tonal components presenting the steep spectral distribution are encoded by a tonal component encoding circuit 603, while the remaining signal frequency components, that is the noisy components, are encoded by a noisy component encoding circuit 604. Output of the tonal component encoding circuit 603 and the nosy component encoding circuit 604 are formed by a code string generating circuit 605 into a code string which is outputted to an ECC encoder 606.

The ECC encoder 606 appends error correction codes to the code string outputted by the code string generating circuit 605. An output of the ECC encoder 606 is modulated by an EFM circuit 607 before being transmitted to a recording head 608. The recording head 608 records the output code string of the EFM circuit 607 on a disc 609. The signal component separating circuit 602 outputs the number of the tonal component information data, position information and the information on the number of the spectral components to the code string generating circuit 605.

Figure 2:
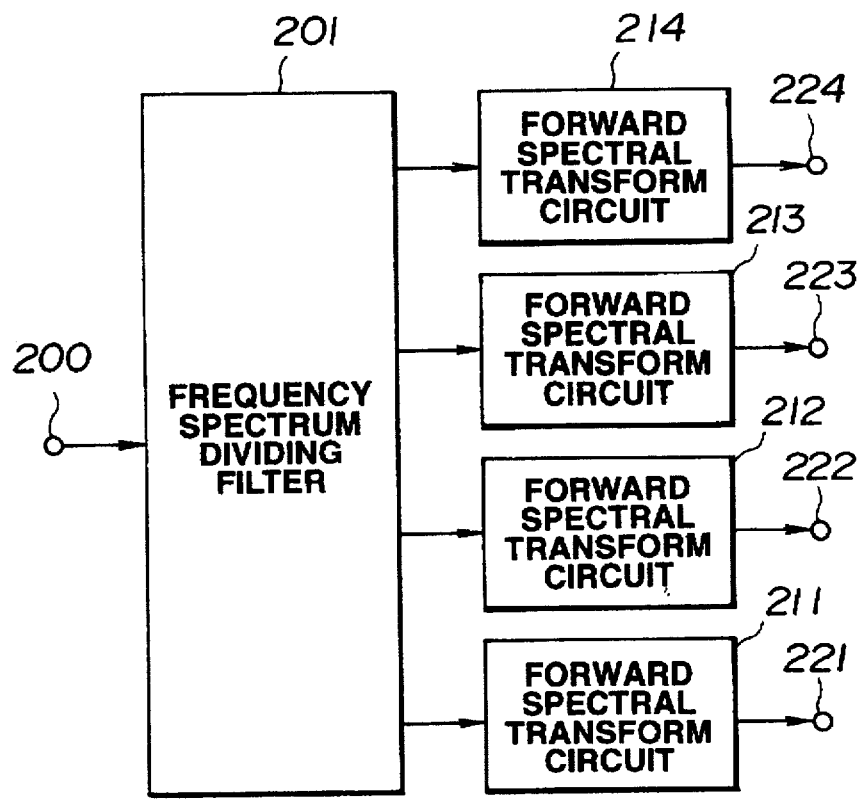
FIG. 2 is a block diagram showing an illustrative arrangement of a transform circuit of a conventional encoding apparatus.

For the transform circuit 601, an arrangement similar to that shown in FIG. 2 may be employed.

Figure 3:
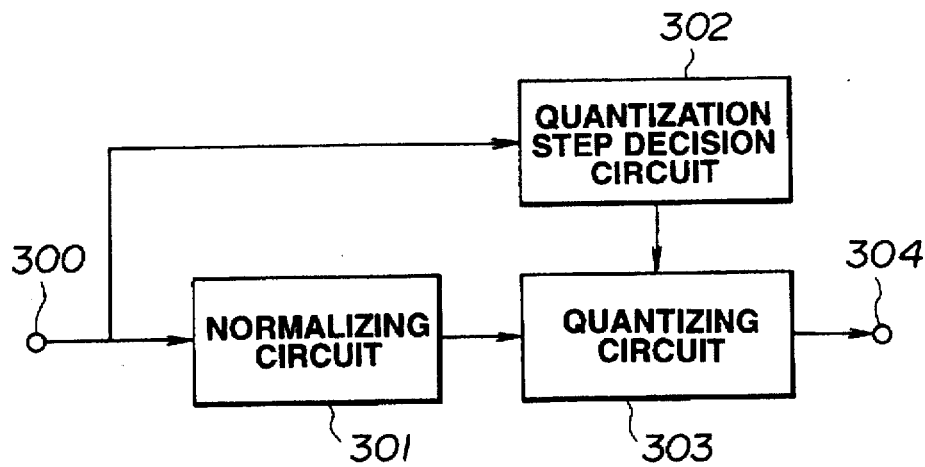
FIG. 3 is a block diagram showing an illustrative arrangement of a conventional signal component encoding circuit.

Of course, the constitution other than that shown in FIG. 2 may be employed for the transform circuit 601. For example, the input signal may be directly transformed by MDCT into spectral signals or the transform into spectral signals by DFT or DCT may be employed instead of by MDCT. The tonal component encoding circuit 603 and the noisy component encoding circuit 604 may basically be realized by the same arrangement as that shown in FIG. 3.

Figure 8:
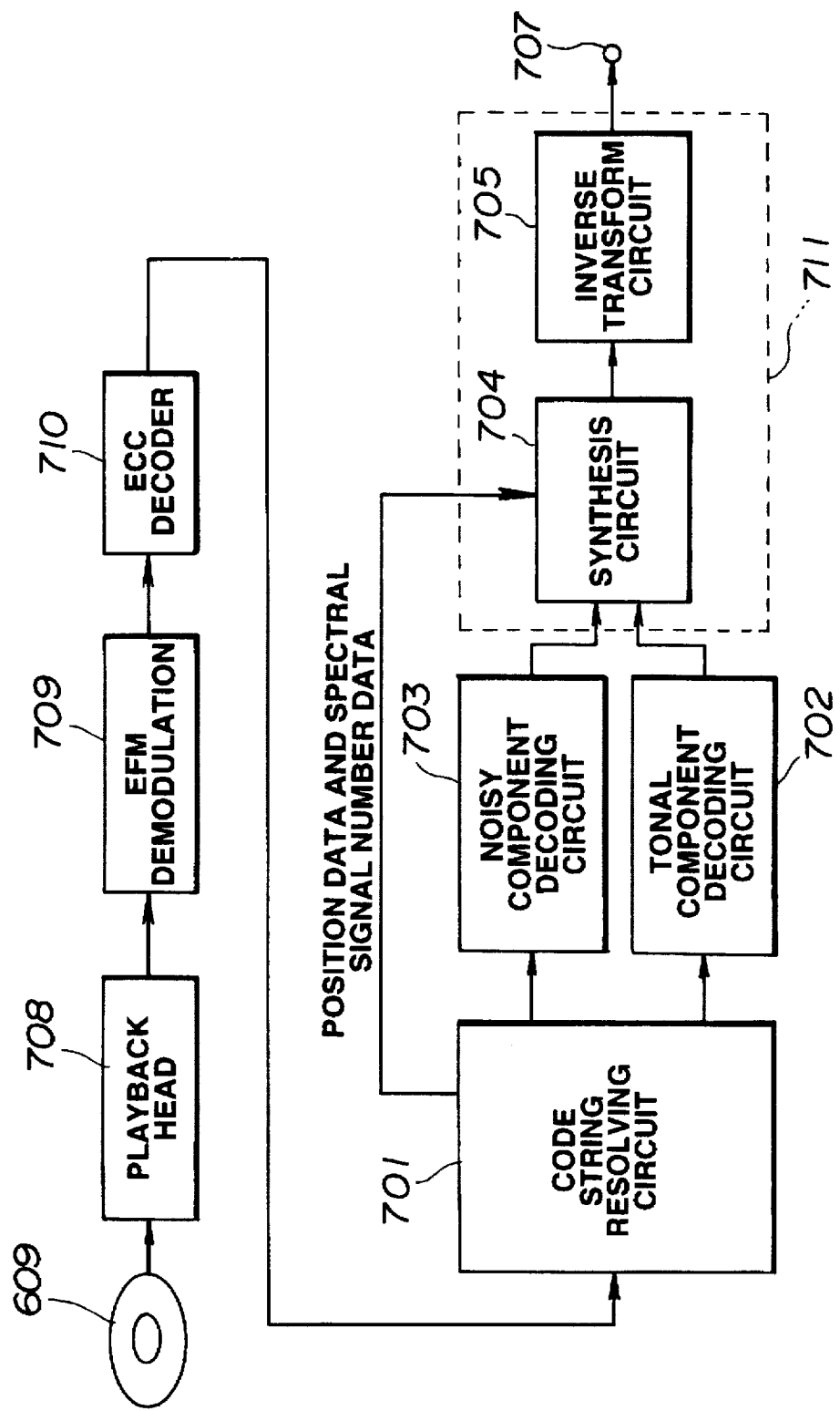
FIG. 8 is a block diagram showing an arrangement of an information decoding apparatus embodying the present invention.

FIG. 8 shows a constitution of a decoding circuit for decoding the code string obtained by the encoding circuit shown in FIG. 7.

Referring to FIG. 8, the code string reproduced from the disc 609 by the playback head 708 is routed to an EFM circuit 709 which demodulates the input code string. The demodulated code string is routed to an ECC decoder 710 for error correction. Based on the number of the information data on the tonal components contained in the error-corrected code string, a code string resolution circuit 701 recognizes which portion of the code string is the tonal component code and separates the input code string into the tonal component codes and the noisy component codes. On the other hand, the code string separating circuit 701 separates the tonal component position information and the spectral component number information from the input code string and outputs the separated information to a downstream side synthesis circuit 704. The tonal component code and the noisy component code are respectively routed to a tonal component decoding circuit 702 and a noisy component decoding circuit 703 where they are inverse quantized and denormalized for decoding. The decoded signals from the circuits 702 and 703 are routed to a synthesis circuit 704 which performs synthesis which is the reverse operation of the separation by the signal component separating circuit 602 shown in FIG. 7.

Figure 17:
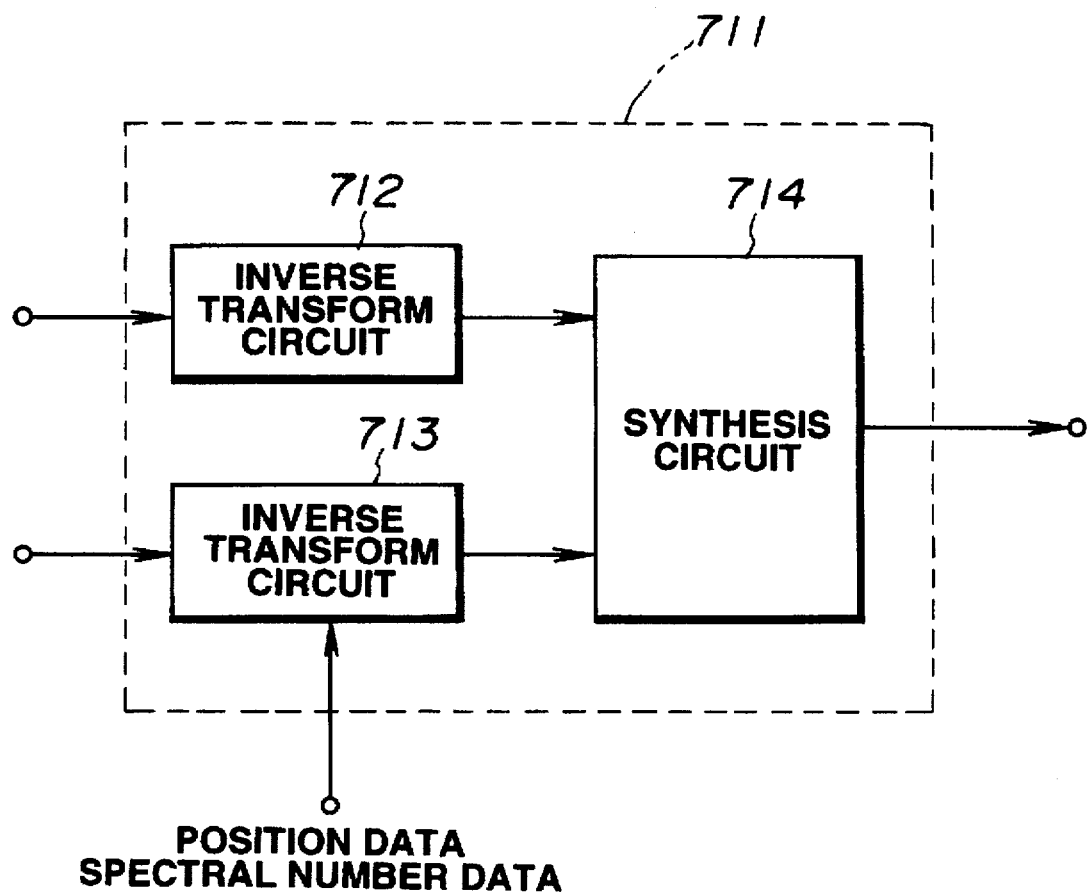
FIG. 17 is a block circuit diagram showing another example of a restoration unit according to the present invention.

Based on the position information and the spectral component number information, routed from the separating circuit 701, the synthesis circuit 704 adds the decoded tonal component signal at a pre-set position of the decoded noisy component signal for synthesizing the noisy and tonal components on the frequency axis. The synthesized decoded signal is transformed by an inverse transform circuit 705 which performs inverse transform which is the reverse operation of the transform performed by the transform circuit 601 shown in FIG. 7 so that the signal is restored from the signal on the frequency axis to acoustic waveform signal on the time axis. An output waveform signal from the inverse transform circuit 705 is outputted at a terminal 707. The operations of inverse transform and synthesis may be reversed, in which case a restoration circuit 711 shown in FIG. 8 has a constitution as shown in FIG. 17. The inverse transform circuit 712 inverse-transforms the decoded noisy component signal on the frequency axis from the decoding circuit 703 into the noisy component signal on the time axis. The inverse transform circuit 713 arrays the decoded tonal component signal from the tonal component decoding circuit 702 at the position on the frequency axis as specified by the spectral number information and the position information of the tonal component transmitted from the code string separating circuit 701 and inverse-transforms the resulting signal for generating the tonal component signal on the time axis. A synthesis circuit 714 synthesizes the noisy component signal on the time axis from the inverse transform circuit 712 and the tonal component signal on the time axis from the inverse transform circuit 713 for restoring the original acoustic waveform signal.

The background of how the information encoding method and the information decoding method are applied in the constitution of the encoding apparatus shown in FIG. 7 and the decoding apparatus shown in FIG. 8 is hereinafter explained.

Figure 9:
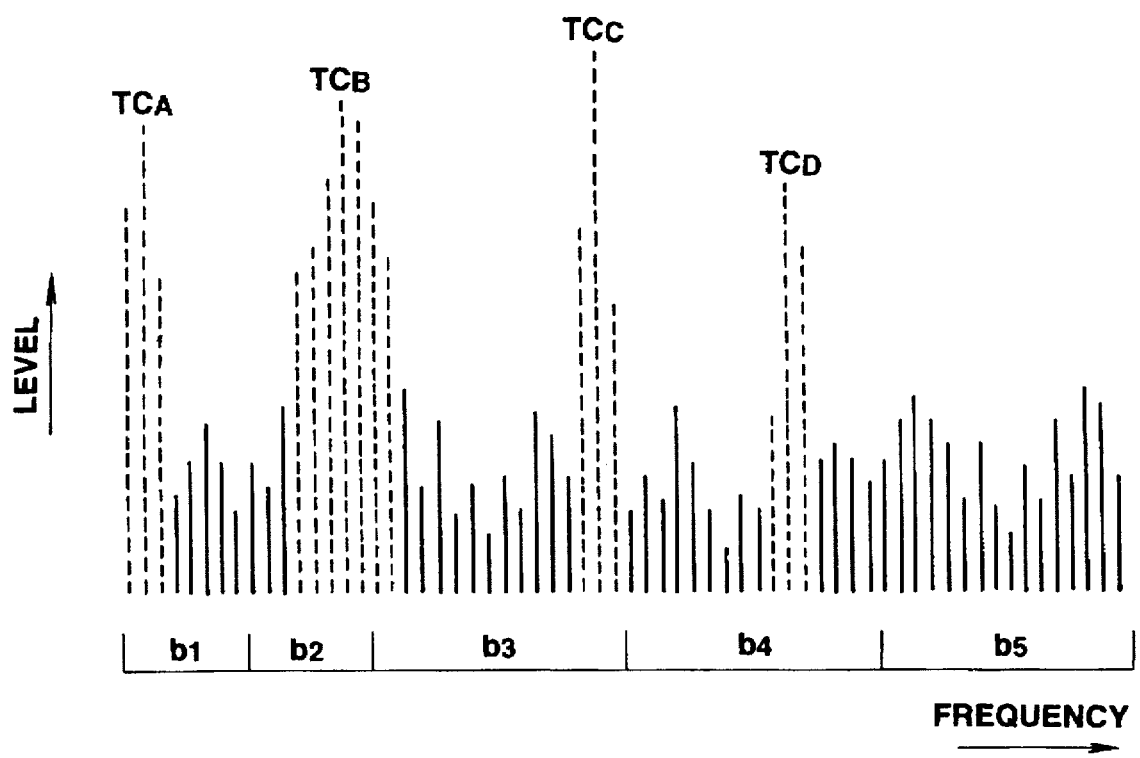
FIG. 9 illustrates spectral signals containing tonal components.

The manner of separating the tonal components from the frequency components is shown in FIG. 9, in which four tonal components $TC_A$, $TC_B$, $TC_C$ and $TC_D$ have been extracted. The tonal components are distributed in a smaller number of spectral components, as shown in the example of FIG. 9. Therefore, if these components are quantized with finer quantization steps, the number of quantization bits on the whole is not increased excessively. Although the tonal components may be normalized and subsequently quantized for raising the encoding efficiency, the normalizing and quantizing processes may also be omitted for simplifying the apparatus, because of the smaller number of the spectral signals constituting the tonal components. In addition, with the example shown in FIG. 9, the number of the spectral signals constituting the tonal components is variable among 3, 5 and 7, such that the tonal component $TC_A$ is made up of three spectral signals, the tonal component $TC_B$ is made up of seven spectral signals and the tonal components $TC_C$ and $TC_D$ are respectively made up of three spectral signals, centered about the maximum value spectral signal, that is the spectral signal having a locally maximum value. In such case, the encoding may be performed on the assumption that the respective tonal components are made up of three, five or seven spectral signals. It is noted that, in the illustrated example, there is no tonal component made up of five spectral signals.

Figure 10:
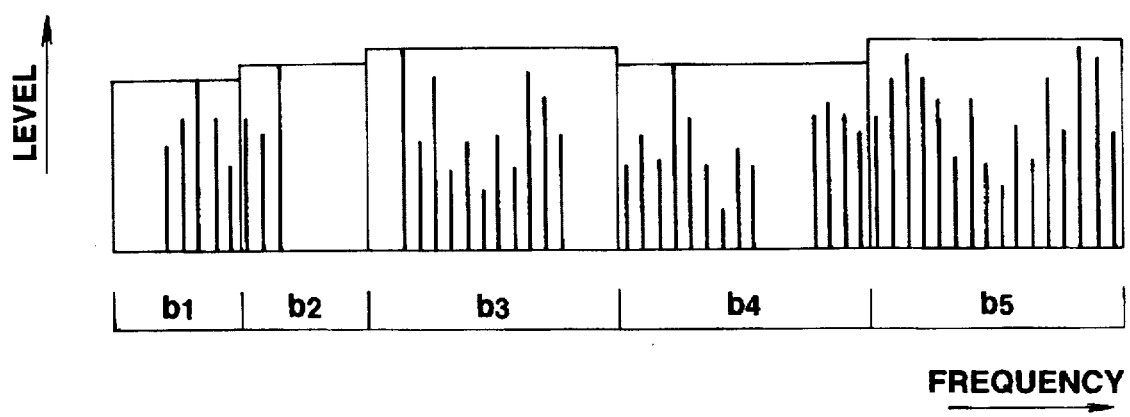
FIG. 10 illustrates spectral signals excluding tonal components.

FIG. 10 shows an example in which the tonal components are eliminated from the original spectral signals shown in FIG. 9 in order to show only the noisy components. Since the tonal components have been eliminated from the original spectral signals in the respective encoding units (bands) $b_1$ to $b_5$ in FIG. 10, the normalization coefficients in each encoding unit $b_1$ to $b_5$ are of smaller values, so that the quantization noise may be reduced even with the use of a smaller number of quantization bits.

Figure 11:
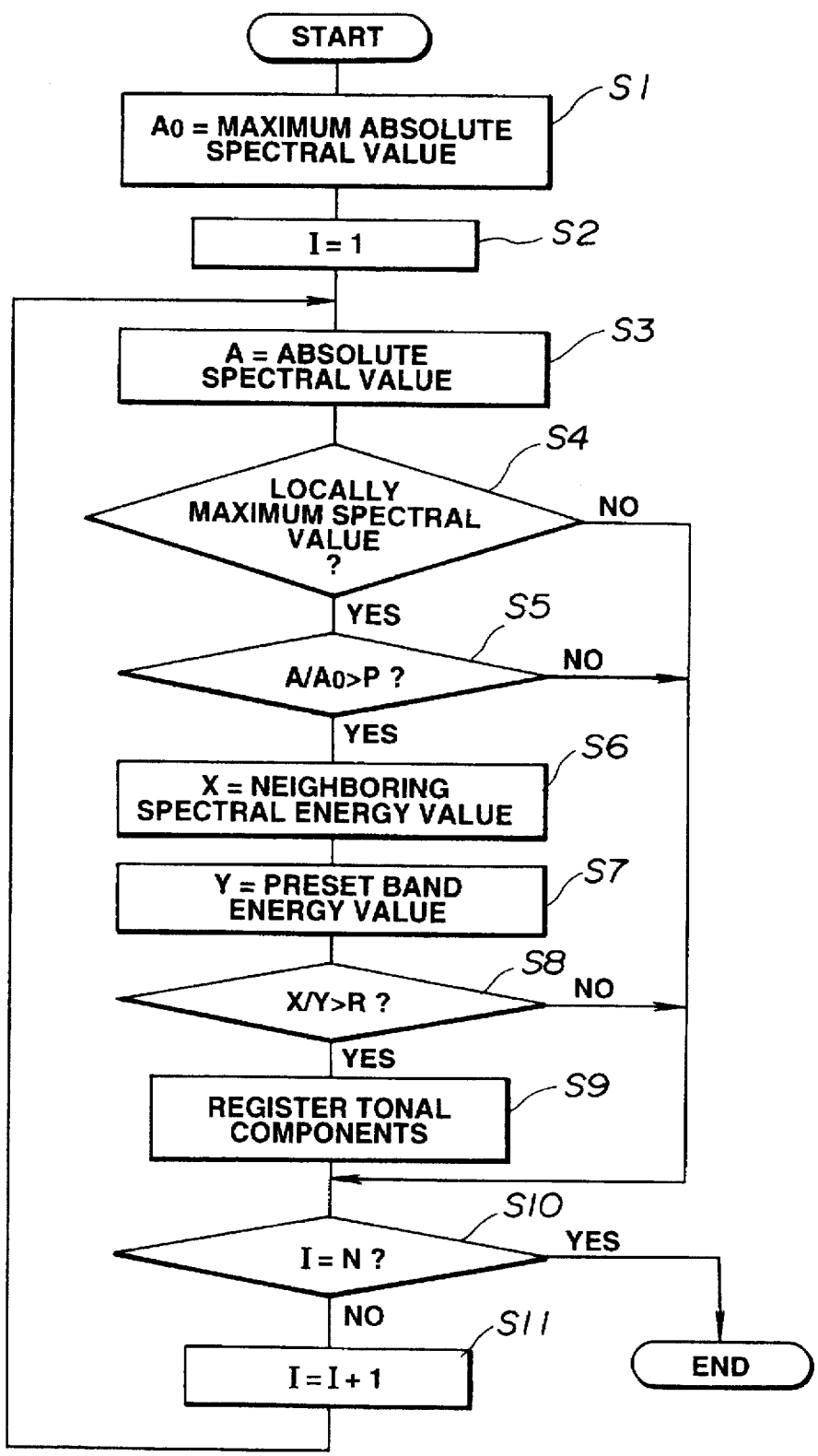
FIG. 11 is a flow chart for illustrating processing flow for separating tonal components.

FIG. 11 shows the processing flow for separating the tonal components by the signal component separating circuit 602.

In FIG. 11, I denotes the serial number of the spectral signals. N denotes the total number of the spectral signals and P, R denote pre-set coefficients. As for the tonal components, if the absolute value of a spectral signal is locally larger than the value of remaining spectral signals and is larger by more than a pre-set value than the maximum value of the absolute values of the spectral signals in the time block for the spectral signals, and also if the sum of the energy of the spectral signals and the energy of neighboring spectral signals, such as tow directly neighboring spectral signals, is related by more than a pre-set ratio to the total energy within a pre-set band containing the spectral signals, the spectral signal and, for example, the two directly neighboring signals, are deemed to be tonal components. The pre-set band as the basis of comparison of the energy distribution ratio may be selected to be narrower and broader towards the low and high frequency ranges in keeping with, for example, the critical bandwidths, in order to take the psychoacoustic characteristics of the human auditory system into account.

In FIG. 11, a maximum absolute value of the spectral signal is substituted at step S1 for a variable $A_0$. At step S2, the serial number I of the spectral signal is set to 1. At step S3, the absolute value of a spectral signal (hereinafter referred to as spectral absolute value) in a time block is substituted for a variable A.

At step S4, it is judged whether or not the above absolute value of the spectral signal is locally larger than the values of other spectral signals, that is if it is the spectral signal having the locally maximum absolute value. If the result is NO, that is if the above absolute spectral value is not the spectral component having the locally maximum absolute value, the program transfers to step S10. If otherwise, the program transfers to step S5.

At step S5, the magnitude of the ratio of the variable A of the spectral signal having the locally maximum value in the time block containing the spectral signal having the locally maximum absolute value to the variable $A_0$ of the maximum absolute value of the spectral signal is compared to that of the coefficient P representing a pre-set magnitude ($A/A_0>P$). If $A/A_0>P$, the program transfers to step S8 and, if otherwise, that is if $A/A_0 \leq P$, the program shifts to step S10.

At step S8, the energy value of spectral components neighboring to the spectral component having the locally maximum absolute value, such as the sum of the energies of both neighboring spectral components, is substituted for the variable X. At the next step S7, the total energy value within a pre-set band containing the spectral component having the locally maximum absolute value and neighboring spectral components is substituted for a variable Y.

At the next step S8, the ratio of the variable X for the energy value to the variable Y of the energy value within the pre-set band is compared to the coefficient R indicating a pre-set ratio ($X/Y>R$). If the result is YES, that is if $X/Y>R$, the program shifts to step S9. If the result is NO, that is if $X/Y \leq R$, the program shifts to step S10.

At step S9, if the ratio of the energy of the spectral signal having the locally maximum absolute value and the neighboring spectral signals to the energy in the pre-set band containing these spectral signals is not less than a pre-set value, the spectral signal having the locally maximum absolute value and the neighboring spectral signals are deemed to be tonal components, and such effect is registered.

At the next step S10, it is judged whether or not the number I of the spectral signals registered at step S9 is equal to the total number N of the spectral signals (I=N). I f the result is YES, that is if I=N, the program is terminated. If the result is NO, that is if In is not equal to N, the program shift to step S11, where I is incremented (I=I+1), that is the number of the spectral signals is incremented by one for each step to return to step S3 for repeating the above process steps.

Figure 12:
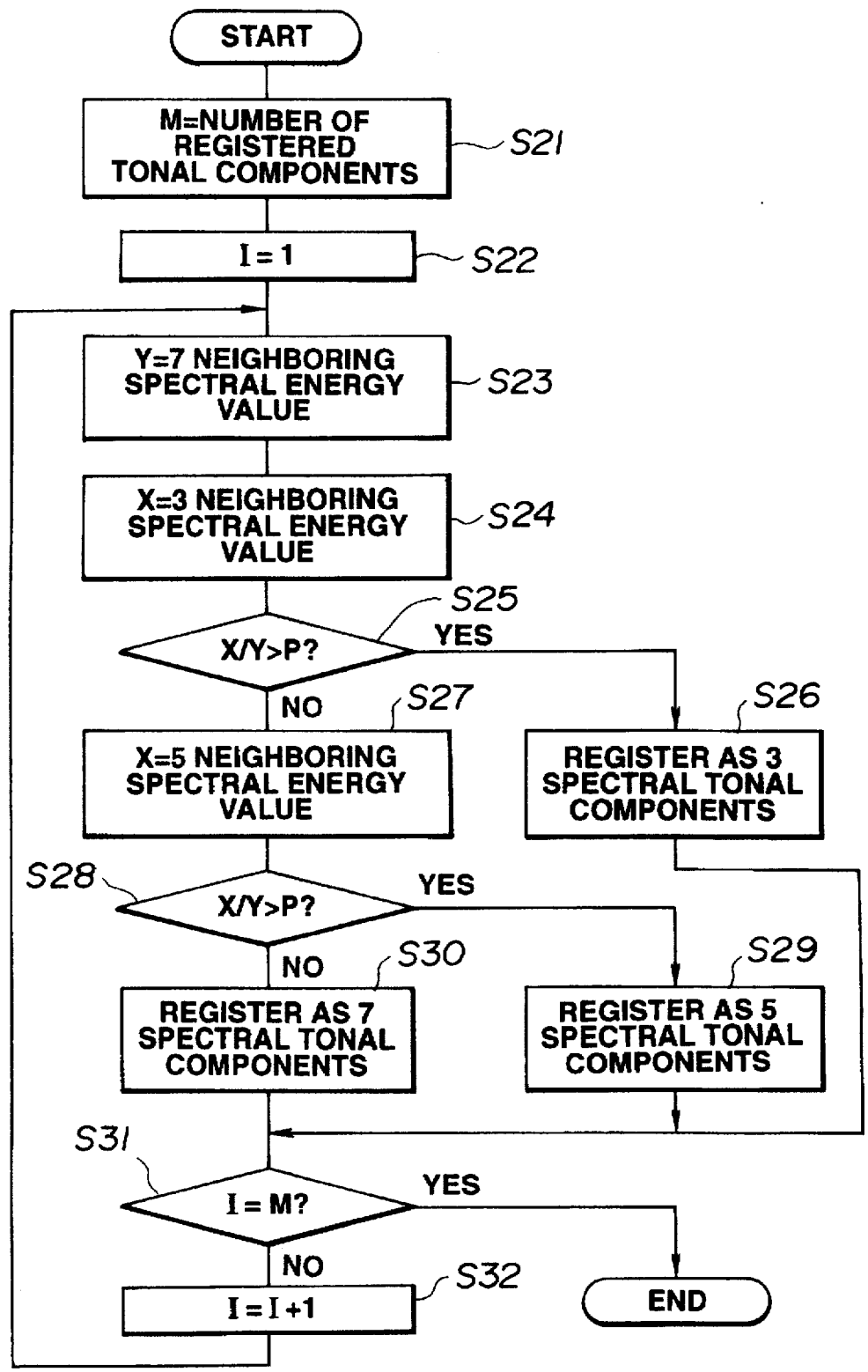
FIG. 12 is a flow chart for illustrating the processing flow for determining the number of spectral signals making up registered tonal components.

FIG. 12 shows the process flow for determining the number of constituent spectral signals of the tonal component registered as tonal component in the example of FIG. 9.

In FIG. 12, the maximum number of the constituent spectral signals of the tonal component is set to 7. If the ratio of the energy of the three or five spectral signals centered about the spectral signal having the locally maximum absolute value to the energy of the seven spectral signals centered about the spectral signal having the locally maximum absolute value, the number of the constituent spectral signals of the tonal component is set to three or five, respectively. Although the registered tonal components are previously classified in the present example, such classification may naturally be performed at the same time as the tonal components are extracted with the number of the spectral signal having the locally maximum absolute value as found at step S9 as the number of the registered tonal components.

In FIG. 12, the number of the registered tonal components is set at step S21 to a variable M. At step S22, the number I of the tonal component is set to 1. At step S23, the energy value of the seven spectral signals neighboring to the locally maximum spectral component is substituted for variable Y. At step S24, the energy value of the thee spectral signals neighboring to the locally maximum spectral component is substituted for variable X.

At step S25, it is judged whether or not the ratio of the energy value of the above seven neighboring spectral signals to the energy value of the three spectral signals (X/Y) exceeds a pre-set ratio P (X/Y>P). If the result is YES, that is if the ratio exceeds P, the program shifts to step S26. If the result is NO, that is if the ratio does not exceed P, the program shifts to step S27.

At step S26, the number of the spectral signals of the tonal component is set to three which is registered as three spectral tonal components. The program then shifts to step S31.

At step S27, the energy value of the five neighboring spectral signals, centered about the locally maximum spectral signal, is substituted for variable X. At the next step S28, it is judged whether or not the ratio of the energy value of the seven neighboring spectral signals to the energy value of the five spectral signals (X/Y) exceeds a pre-set ratio P (X/Y>P). If the result is YES, that is if the ratio exceeds P, the program shifts to step S29. If the result is NO, that is if the ratio does not exceed P, the program shifts to step S30.

At step S29, the number of the spectral signals of the tonal component is set to five which is registered as five spectral tonal components. The program then shifts to step S31.

At step S30, the number of the spectral signals of the tonal component is set to seven which is registered as seven spectral tonal components. The program then shifts to step S31.

At step S31, it is determined whether or not the number of the tonal components M set at step S21 is equal to the number I of the tonal components (I=M). If the result is YES, that is if I=M, the program is terminated. If the result is NO, that is if I is not equal to M, the program shifts to step S32.

At step S32, I is incremented by one for each step (I=I+1) to return to step S23 for repeating the above process steps.

Figure 13:
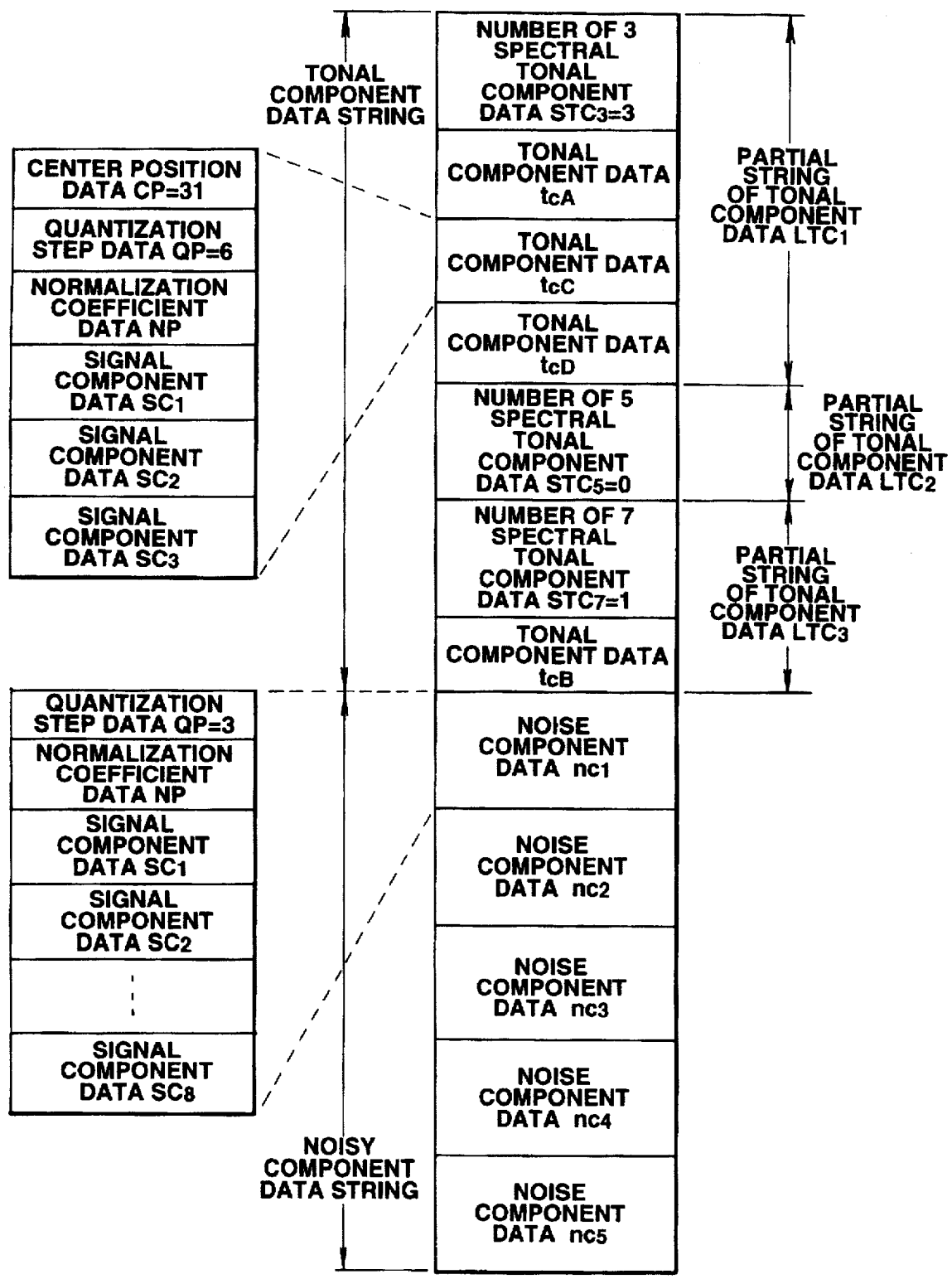
FIG. 13 illustrates an exemplary code string.

FIG. 13 shows an array of information data when the information data separated into the tonal and noisy components as described above are encoded in accordance with the encoding method described in U.S. patent application Ser. No. 08/308,859 proposed by the present Assignee (filing data, Sep. 15, 1994) for recording or transmission. Since the recording medium may be deemed to be a transmission path, the term "transmission" herein is meant to comprise recording the information on the recording medium.

In FIG. 13, the tonal components are transmitted by groups each consisting of the same number of the spectral components. That is, in the present example, as the information indicating all of the tonal components having the number of the constituent spectral signals equal to three, the number of the tonal components (as the number of the information data for the three spectral tonal components $STC_3=3$) and the contents of the tonal components $TC_A$, $TC_C$ and $TC_D$, that is the tonal component information data $tc_A$, $tc_C$ and $tc_D$, are transmitted as the partial tonal component information string $LTC_1$. The information indicating all of the tonal components having the number of the constituent spectral components equal to five, and the information indicating all of the tonal components having the number of the constituent spectral components equal to seven, are subsequently transmitted in the similar manner as the partial tonal component information strings $LTC_2$ and the partial tonal component information string $LTC_3$, along with the contents of the tonal components $TC_B$, that is the tonal component information data $tc_B$. If the tonal components are transmitted by groups each having the same number of the constituent spectral signals, it becomes unnecessary to transmit the information concerning the number of spectral signals making up the constituent spectral signals, so that efficient coding becomes possible in case there are a large number of tonal components.

The information on the tonal components tc includes the center position information CP indicating the center of spectrum position of the tonal components, such as CP=31 for the tonal component $TC_c$, the information on the quantization steps indicating the number of quantization bits QP (for example, QP =6), the information on the normalization coefficients NP and the information on respective signal components indicating the normalized and quantized values of the remaining spectral signals making up the tonal components, such as the information $SC_1$, $SC_2$, ... $SC_3$.

The information on the noisy components is recorded or transmitted in the sequence of $nc_1$, $nc_2$, $nc_3$, $nc_4$ and $nc_5$ associated with the bands $b_1$ to $b_5$ of FIG. 10, respectively. The information on the noisy component nc includes the information on the quantization steps QP (QP=3 in the case of the information $nc_1$), the information on the normalization coefficients NP and the information on respective normalized and quantized signal components, such as the information $SC_1$, $SC_2$, ... $SC_3$.

However, in the code string of the present example, it is necessary to transmit the number of spectral signals despite the fact that there is no tonal component constituted by five spectral signals. In the illustrated example, only three different numbers of the spectral signals constituting the tonal components are allowed. However, in the design statement for coding in which the information data need to be encoded by the same encoding method depending on the variable compression ratios and the demanded sound quality level, it is necessary to allow for a large number of spectral signals making up the tonal components in the design statement, while it is not efficient to transmit the number of the information data on the tonal components for the partial string of the tonal component data which is not in use.

Figure 14:
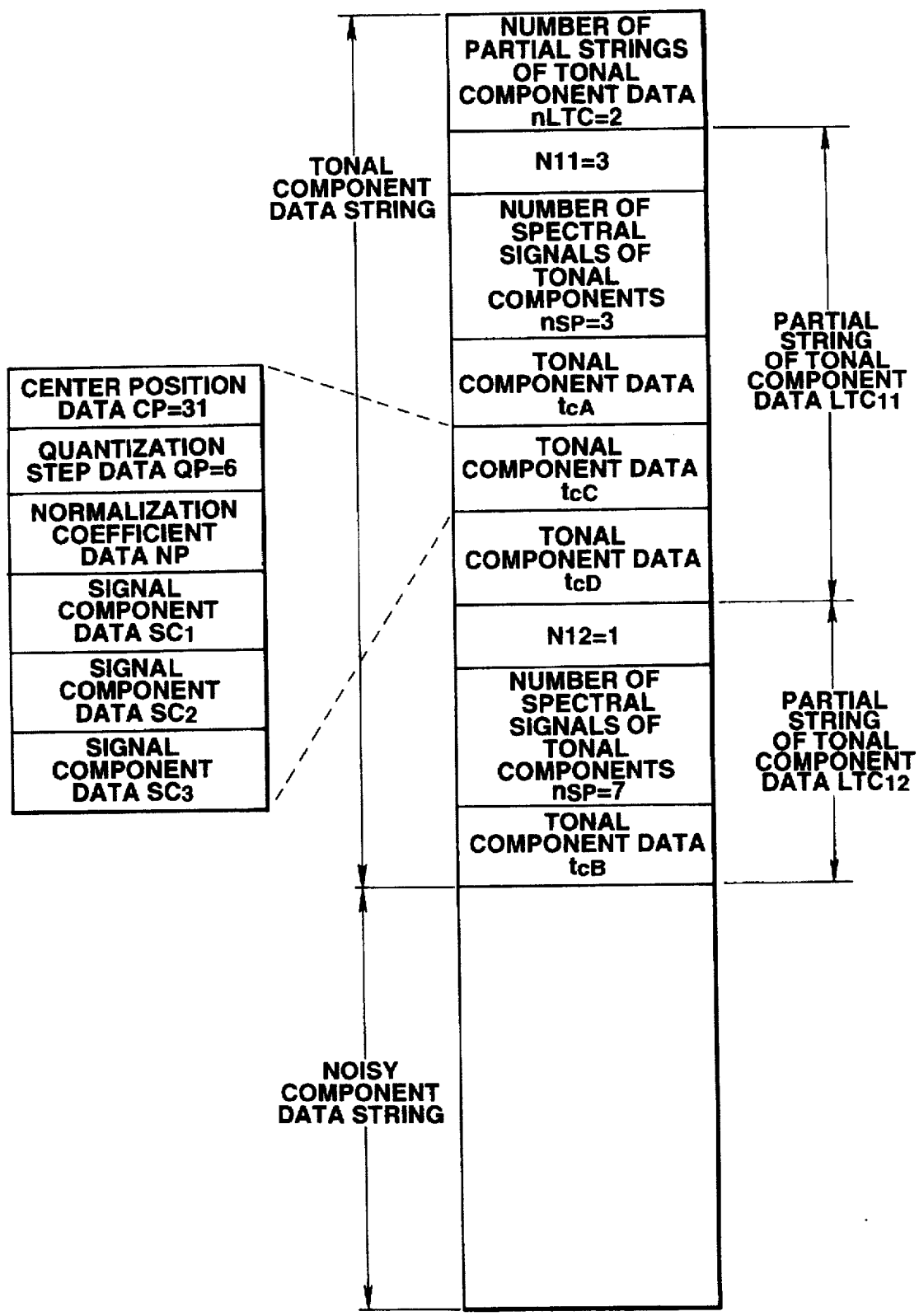
FIG. 14 illustrates a code string produced by the encoding method of the present invention.

FIG. 14 shows an example of a code string constitution in case the spectral signal shown in FIG. 9 according to the transmission method of the present invention, in which the above-mentioned point is taken into account, is encoded.

In FIG. 14, the number of the partial strings of the information on the tonal components $n_{LTC}$ (in the example of FIGS. 9 and 14, $n_{LTC}=2$) is first transmitted, followed by the a number of partial strings of the information on the tonal components $LTC_{11}$ and $LTC_{12}$, as specified therein. In the example of FIG. 14, the number $N_{11}$ indicating the number of the information data tc for the tonal components in the partial string $LTC_{11}$ (in the present example, $N_{11}=3$), the number of spectral signals making up the spectral components $n_{sp}$ indicating the number of the spectral signals making up the tonal components (in the present example, $n_{sp}=3$) and the actual information on the tonal components $tc_A$, $tc_C$ and $tc_D$, are transmitted as the partial string $LCT_{11}$. Since the number of any of spectral signals making up the tonal components is not equal to 5 in the present example, such partial information string is not encoded. As the partial string $LCT_{12}$, the number $N_{12}$ indicating the number of the information data tc for the tonal components in the partial string $LTC_{12}$ (in the present example, $N_{12}=3$), the number of spectral signals making up the tonal component $n_{sp}$ indicating the number of the spectral signals making up the tonal component (in the present example, $n_{sp}=7$) and the actual information on the tonal components $tc_B$ are transmitted. Since there is no necessity of transmitting the information on the void partial information string of the tonal component, efficient encoding may be achieved, especially if different kinds of the partial information string need to be allowed for the reason discussed in the foregoing.

Figure 4:
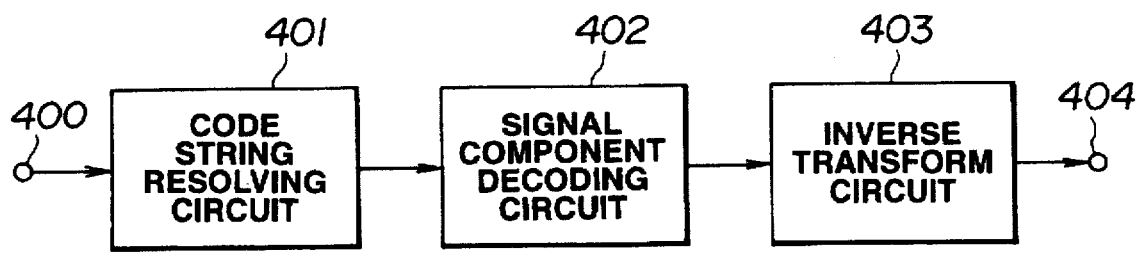
FIG. 4 is a block circuit diagram showing a basic arrangement of a conventional decoding circuit.
Figure 5:
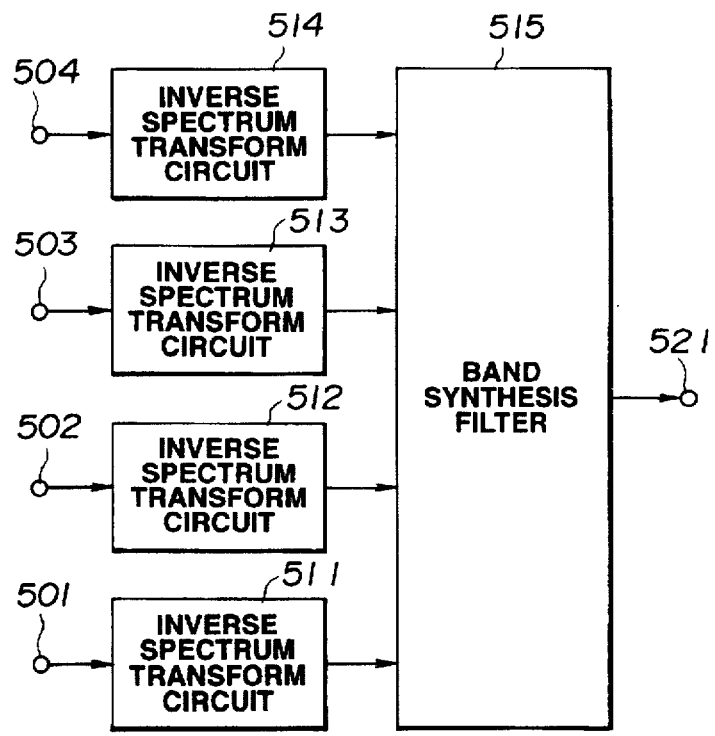
FIG. 5 is a block circuit diagram showing an illustrative arrangement of an inverse transform circuit of a conventional decoding circuit.
Figure 6:
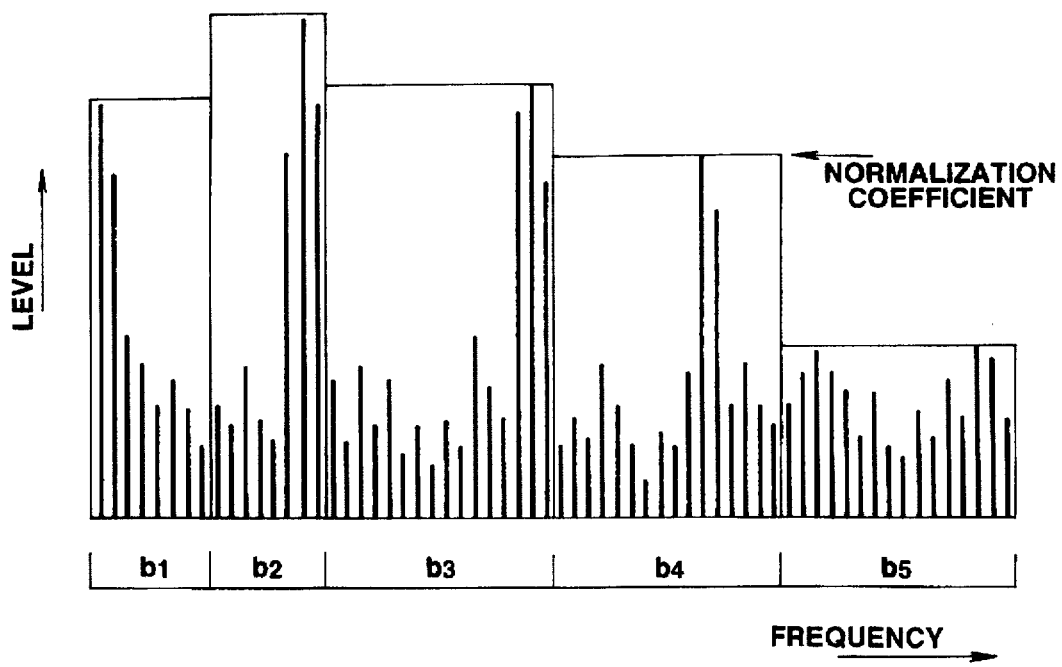
FIG. 6 illustrates an encoding method according to a conventional technique by way of comparison to the present invention.

In the example of FIG. 4, the partial information string on the tonal components is produced by grouping based upon the number of the spectral signals constituting the tonal component. However, the method of the present invention may be applied to such a case in which the partial information strings for the tonal components are constituted by grouping the information on the tonal components based on other attributes than the number of the spectral signals constituting the tonal component.

Specifically, the grouping may be made based upon the information on the quantization steps. Referring to FIGS. 9, 15, 17 and 18, an illustrative example of grouping based upon the information on the quantization steps are explained.

It is assumed that the signal component separating circuit 602 separates tonal components from frequency components, as shown in FIG. 9. In the present example, four tonal components $TC_A$, $TC_B$, $TC_C$ and $TC_D$ have been extracted, as previously explained. If it is allowed to quantize the spectral components at the quantization steps corresponding to the information on the quantization step QP=6 or at the quantization steps corresponding to the information on the quantization step QP=4, the quantization step decision circuit in the tonal component encoding circuit 603 determines the quantization step of the respective tonal components in the following manner.

Figure 18:
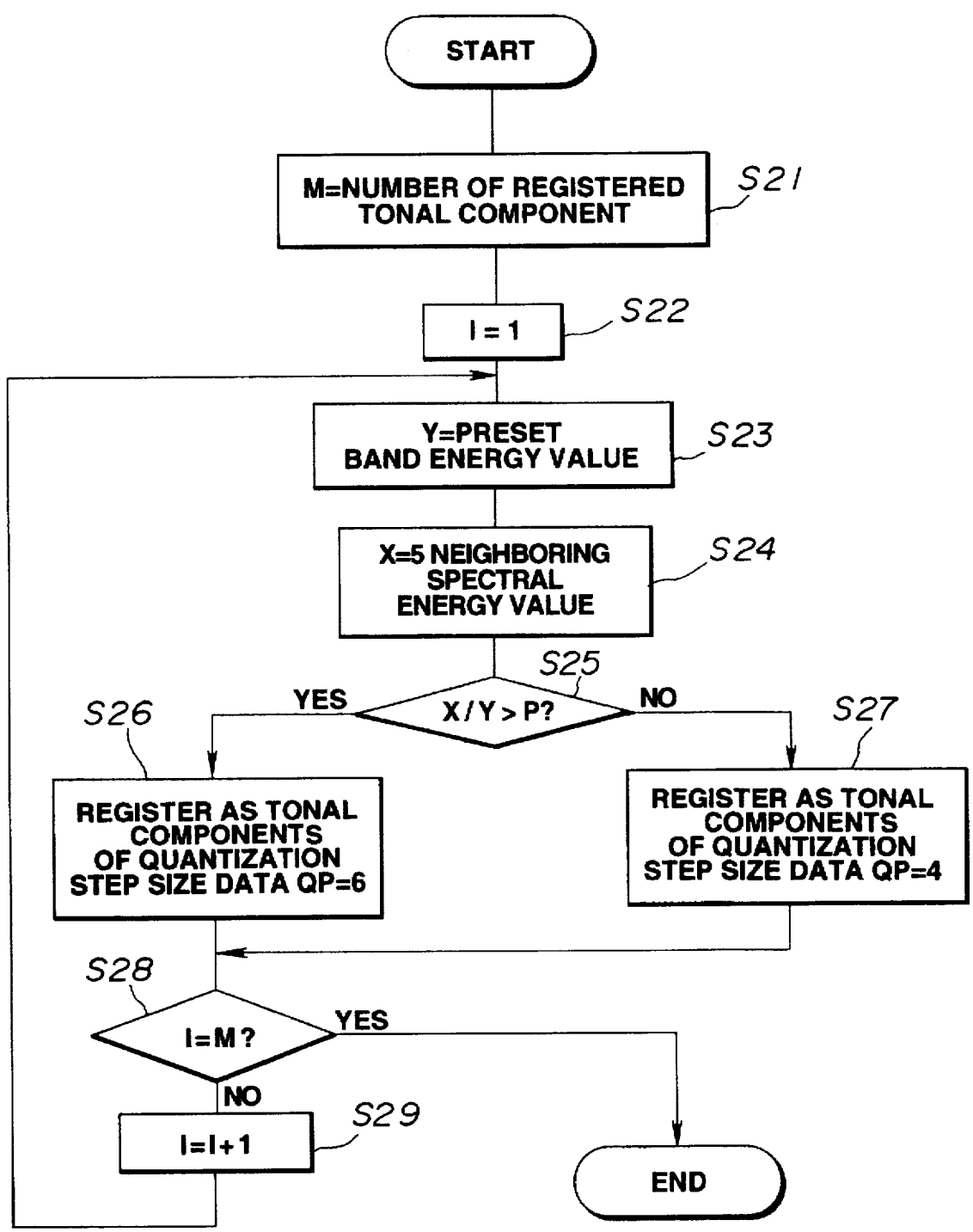
FIG. 18 is a flow chart showing the processing flow during grouping the tonal components.
Figure 19:
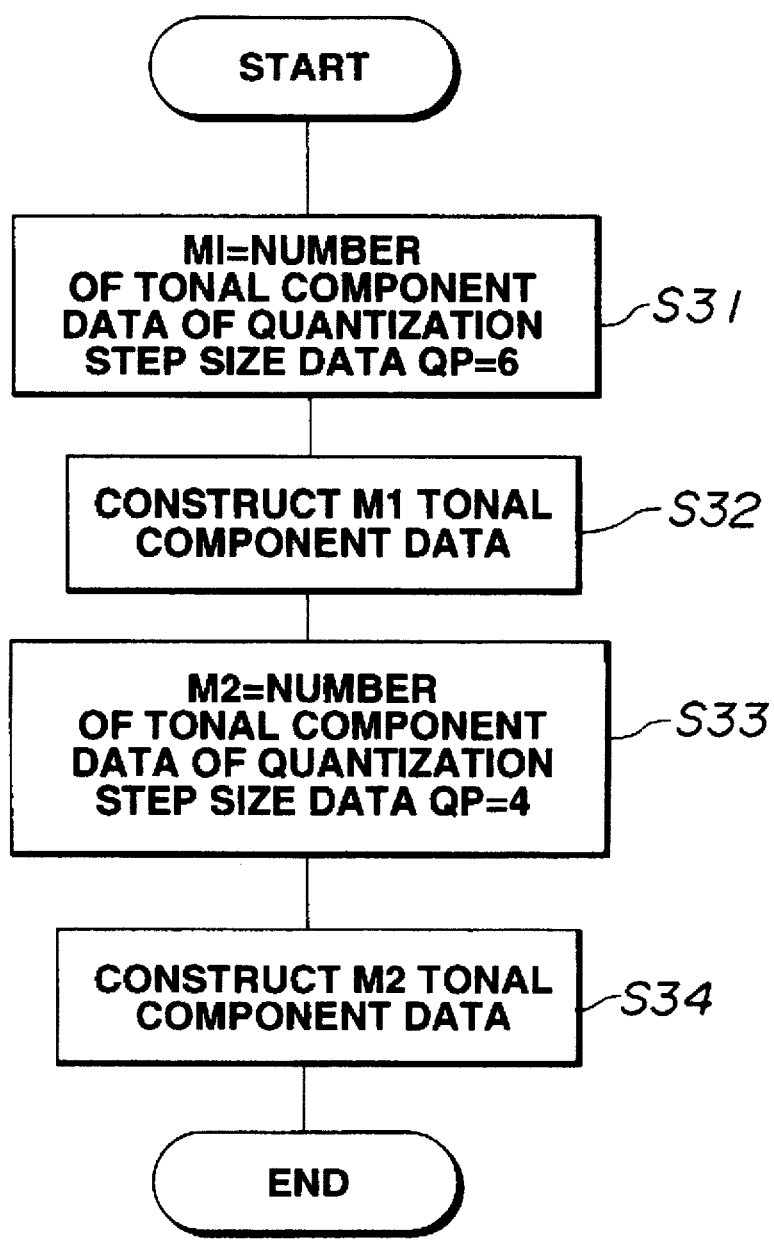
FIG. 19 is a flow chart illustrating the processing flow of the information decoding method according to the present invention.

FIG. 18 shows an illustrative processing flow for grouping the tonal components depending on the quantization steps by the tonal component encoding circuit 603. In this figure, grouping is made on the tonal components previously extracted and registered by the processing of FIG. 11. In the present example, if the ratio of the energy value of five spectral signals centered about the center spectral signal of the tonal component to the energy value in a pre-set band exceeds the value P, the tonal components are grouped as being the tonal components quantized with the information on the quantization steps QP=6. If otherwise, the tonal components are grouped as being the tonal components quantized with the information on the quantization steps QP=4.

Referring to FIG. 18, the registered number of the tonal components is substituted at step S21 for a variable M. At step S22, the number I of the tonal components is set to 1. At the next step S23, the energy value of the pre-set band is substituted for variable Y. At step S24, the energy value of the neighboring five spectral signals is substituted for variable X.

At step S25, it is judged whether or not the ratio of the variable X for the energy value of the five neighboring spectral signals to the variable Y of the energy of the pre-set band is larger than the value P (X/Y>P). If the result is YES, that is if X/Y is larger than P, the program sifts to step S26. If the result is NO, that is if X/Y is less than P, the program shifts to step S27.

At step S26, the tonal components are grouped or registered as being the tonal components with the quantization step information QP=6. At step S27, the tonal components are grouped or registered as being the tonal components with the quantization step information QP=4. The program then shifts to step S28.

At step S28, it is judged whether or not the number I of the tonal components is equal to the variable M for the number of the registered tonal components. If the result is YES, the processing comes to a close. If the result is NO, the program shifts to step S29 where the number of the tonal components I is incremented (I=I+1) to return to step S23 for repeating the above process steps.

The quantization step for each of the tonal components is determined in this manner by the tonal component encoding circuit 603. For example, $TC_A$, $TC_C$ and $TC_D$ are quantized with the quantization step corresponding to the information on the quantization step QP=6 to give $tc_A$, $tc_C$ and $tc_D$. In addition to the information on the number of the spectral signals, the information on the tonal components, quantized in the manner described above, the information on the quantization step and the information on the grouping, are supplied to the code string generating circuit 605, which then generates and outputs a code string shown in FIG. 15 based on the above data.

Figure 15:
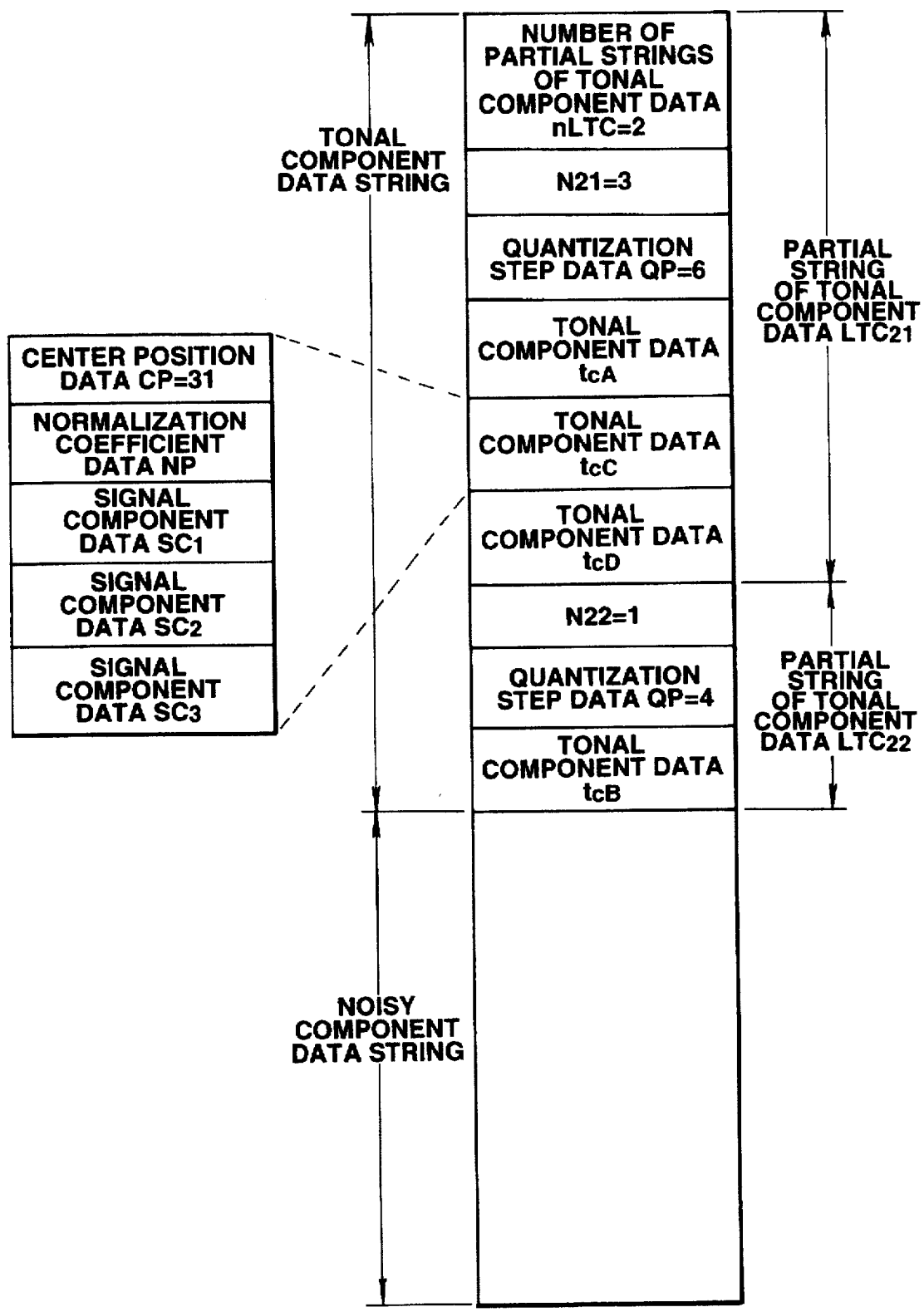
FIG. 15 illustrates another exemplary code string.

FIG. 15 shows an example in which the partial information string is constituted based upon the information on the quantization step. In the present example, the number of the spectral signals making up the tonal components is assumed to be the same for all of the tonal components. Of course, the number of the spectral signals making up the tonal components may be encoded as being part of the information on the respective tonal components.

In the present example of FIG. 15, the number of the partial information strings of the tonal components $n_{LTC}$ (in the example of FIG. 15, $n_{LTC}=2$) is first transmitted, followed by the a number of partial information strings $LTC_{21}$ and $LTC_{22}$ specified therein. In the example of FIG. 15, the number $N_{21}$ indicating the number of the tonal components tc in the partial information string $LTC_{21}$, that is the number of the tonal components quantized at the quantization step corresponding to the information on the quantization step QP=6 ($N_{21}$=3 herein), the information on the quantization steps QP (QP=6 herein) and the information on actually quantized tonal components $tc_A$, $tc_C$ and $tc_D$, are transmitted in this order as the partial information string for the tonal components $LTC_{21}$. On the other hand, the number $N_{22}$ indicating the number of the tonal components tc in the partial information string $LTC_{22}$, that is the number of the tonal components quantized at the quantization step corresponding to the information on the quantization step QP=4 ($N_{22}$=1 herein), the information on the quantization steps QP (QP=4 herein) and the information on actually quantized tonal components $tc_B$, are transmitted in this order as the partial information string for the tonal components $LTC_{22}$.

This eliminates the necessity of according the information on the quantization steps to the respective tonal components. For example, the information on the tonal components $tc_C$ of FIG. 15 may be made up only of the center position information CP, the normalization coefficient information NP and the information on the respective signal components SC. Thus, in the example of FIG. 15, the encoding efficiency may be improved especially if there are a large number of tonal components.

Of course, the sequence of transmission of the respective information data may be changed from that described above. For example, the information on the quantization step QP=6, the corresponding number of the information data on the tonal components $N_{21}$=3, the information on the quantization step QP=4 and the corresponding number of the information data on the tonal components $N_{22}$=1, may be first transmitted as a lump and the information on the tonal components indicating the contents of the tonal components $tc_n$ may be transmitted subsequently.

FIG. 18 shows, in a flow chart, the processing flow in decoding the string of the information of the tonal components corresponding to the code string shown in FIG. 15. In the flow chart of FIG. 18, the numbers of the tonal components contained in the respective groups and the tonal components encoded in accordance with the information are decoded sequentially.

Referring to FIG. 18, the number of the information data concerning the tonal components with the information on the quantization step QP=6 is substituted at step S31 for a variable M1. At the next step S32, the tonal components contained in the group are decoded for constructing M1 information data on the tonal components.

At step S33, the number of information data on the tonal components with the information on the quantization step QP=4 is substituted for a variable M2. At the next step S34, the tonal components contained in this group are decoded for constructing M2 information data on the tonal components.

Figure 16:
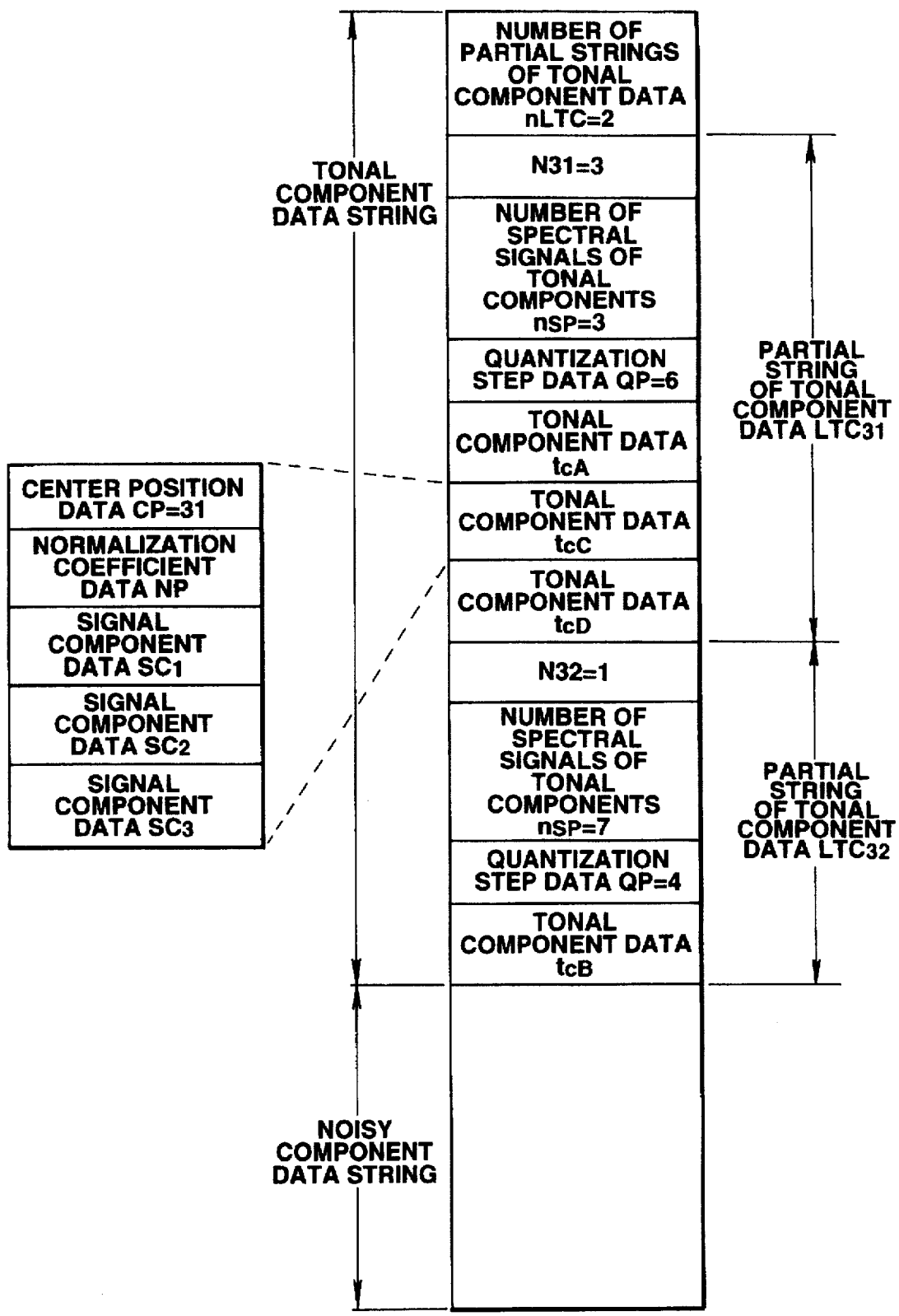
FIG. 16 illustrates still another exemplary code string.

FIG. 16 shows another example of a code string produced by encoding in accordance with the method of the present invention. In the present example, the information on the tonal components is grouped based upon the information on the number of the spectral signals of the tonal components and the information on the quantization steps. In such case, the encoding efficiency is increased, since neither the information on the number of the spectral signals making up the tonal components nor the information on the quantization step is the information on the tonal components and it is only sufficient to encode the tonal components from one information partial string on the tonal components to another. In the method shown in FIG. 13, the partial information string on the tonal components need to be encoded for all of the combinations of the numbers of the spectral components and the information on the quantization step. In the method of the present invention, since it suffices to encode the partial information strings on the tonal components which are not void strings, the encoding efficiency may be improved significantly.

Although the number of the partial information strings on the tonal components is encoded in the above example, it is also possible to utilize the flag information indicating whether or not the partial information string on the respective tonal components is to be encoded. Such arrangement may be comprised within the scope of the present invention. However, it is more efficient to encode the number of the encoded partial information strings, as shown in the above-described embodiments.

In the above description, the center position information CP is transmitted as the position information for the tonal components. It is however possible to transmit the lower most spectral signal position for each tonal component, such as 30 for the tonal component $TC_c$, in place of the center position information.

Although it is desirable for increasing the encoding efficiency to separate and encode spectral components having spectral energies concentrated in the vicinity of specified frequencies as being the tonal components, signal separation need not necessarily be based on the spectral energy and those spectral components of a specified range encoded with the position information on the frequency axis may be comprised within the tonal components according to the present invention.

In addition, although the recording medium is the disc 609 in the above explanation, the disc may also be an optical disc, a magneto-optical disc or a phase transition disc. The recording medium may also be a tape-shaped recording medium employed in an audio cassette or a video cassette, a disc-shaped recording medium, such as a hard disc or a floppy disc or a semiconductor recording medium, such as an IC memory card.

The above description has been made mainly in connection with acoustic signals. However, the present invention may also be applied to encoding of waveform signals in general. The present invention may, however, be applied most effectively to the acoustic signals because the information on the tonal components has significant meaning in connection with the human auditory system.

Although the respective tonal components are normalized and subsequently quantized for encoding the tonal components, the present invention may also be applied to the tonal components quantized without normalization. However, the encoding efficiency may be improved by first normalizing and subsequently quantizing the tonal components, as in the above-described embodiments.

The encoding method for the noisy components of the present invention is not limited to re-quantization followed by encoding but may also be applied to normalization followed by encoding.

The present invention provides an illustrative method for efficiently realizing the method described in our copending PCT/JP94/00880 and U.S. patent application Ser. No. 08/308859 and may be applied in conjunction with the various methods proposed in these co-pending applications.

With the information encoding method and apparatus according to the present invention, high efficiency encoding may be achieved by classifying the first signal as the tonal components into partial information strings in accordance with the common information, not coding void ones of the partial information strings, and by jointly encoding the information indicating the encoded partial information strings, that is by separating the tonal components into groups, not encoding the groups not containing the tonal components and encoding the number of the encoded groups.

With the information transmission method and the information recording medium according to the present invention, efficient transmission may be achieved by transmitting the information encoded by the information encoding method and apparatus according to the present invention.

With the decoding method and apparatus according to the present invention, the information indicating the encoded partial information strings excepting the non-encoded void partial information strings are decoded and, based on the decoded results, decoding is made of the partial information strings consisting in the first signal of the tonal components classed in accordance with the common information.

With the method of the present invention, tonal signals may be efficiently encoded so that high efficiency encoding may be achieved on the whole. The favorable effect of the present invention may be manifested most significantly when the encoding in meeting with various compression ratios and sound quality levels is to be achieved in accordance with the same standard.

What is claimed is:

1. A method for encoding an input acoustical signal comprising
   transforming the input acoustical signal into frequency components,
   separating the frequency components into a first signal composed of tonal components and a second signal composed of noise spectra,
   encoding said first signal by way of first encoding,
   encoding said second signal by way of second encoding, and
   generating a code string for transmission or recording based on encoded signals produced by said first encoding and the second encoding,
   said code string including partial information strings grouped so as to have common values on the basis of at least one of a plurality of parameters, wherein said plurality of parameters includes parameters pertaining to the frequency separation and parameters pertaining to the first encoding.

2. The method as claimed in claim 1, wherein the code string contains only partial information strings corresponding to a signal substantially encoded in said first encoding and also contains information indicating the constitution of the code string.

3. The method as claimed in claim 2, wherein the information indicating the constitution of the code string indicates how many partial information strings are in the code string.

4. The method as claimed in claim 1, wherein the reference parameter is information indicating how many spectral signals make up the tonal components separated by the frequency separation.

5. The method as claimed in claim 1, wherein the first encoding includes quantization of said first signal and said reference parameter is information on the quantization step size for quantization.

6. The method as claimed in claim 1, wherein the first encoding includes quantization of said first signal and said reference parameter is information indicating how many spectral signals make up the respective tonal components separated by said frequency separation and information on the quantization step size for quantization.

7. A method for transmitting an encoded signal generated by transforming the input acoustical signal into frequency components, separating the frequency components into a first signal composed of tonal components and a second signal composed of noise spectra, and encoding said first and second signals, comprising
   transmitting a first code string corresponding to said first signal, and
   transmitting a second code string corresponding to said second signal,
   said first code string including partial information strings grouped so as to have common values on the basis of at least one of a plurality of parameters, wherein said plurality of parameters includes reference parameters pertaining to the frequency separation and parameters pertaining to the first encoding.

8. The method as claimed in claim 7, wherein the first code string contains only partial information strings corresponding to a signal substantially encoded in said first encoding and also contains information indicating the constitution of the code string.

9. The method as claimed in claim 7, wherein at least one of the reference parameters is information indicating how many spectral signals make up the tonal components separated by the frequency separation.

10. The method as claimed in claim 7, wherein the first encoding includes quantization of said first signal and at least one of said reference parameters is information on the quantization step size for quantization.

11. The method as claimed in claim 7, wherein the first encoding includes quantization of said first signal and at least one of said reference parameters is information indicating the number of spectral signals making up the respective tonal components separated by said frequency separation and information on the quantization step size for quantization.

12. The method as claimed in claim 7, wherein information indicating the constitution of the first code string indicates how many partial information strings are in the first code string.

13. A method for decoding a code string composed of encoded signals, comprising
   decoding an encoded signal corresponding to a first signal made up of tonal components for generating first decoded signals by way of first decoding,
   decoding an encoded signal corresponding to a second signal made up of noise spectra for generating second decoded signals by way of second decoding, and
   synthesizing said first and second decoded signals for restoring an original signal,
   said first decoding or said restoring employing a sole reference parameter for decoding or restoring.

14. The method as claimed in claim 13, wherein the code string contains only partial information strings corresponding to a signal substantially encoded in said first encoding and also contains information indicating the constitution of the code string.

15. The method as claimed in claim 14, wherein information indicating the constitution of the code string indicates how many partial information strings are in the code string.

16. The method as claimed in claim 13, wherein the sole parameter is information indicating how many spectral signals make up each tonal component.

17. The method as claimed in claim 13, wherein the first decoding includes inverse quantization of inverse-quantizing said first signal and said sole reference parameter is information on the quantization step size for quantization.

18. The method as claimed in claim 13, wherein the first decoding includes inverse quantization of inverse-quantizing said encoded signal and said sole reference parameter is information indicating the number of spectral signals making up the respective tonal components and information on the quantization step size for inverse quantization.

19. An apparatus for encoding an input acoustical signal comprising means for transforming the input acoustical signal into frequency components,
separation means for separating the frequency components into a first signal composed of tonal components and a second signal composed of noise spectra,
first encoding means for encoding said first signal by way of first encoding,
second encoding means for encoding said second signal by way of second encoding, and
means for generating a code string for transmission or recording based on encoded signals produced by said first and second encoding means, said code string including partial information strings grouped so as to have common values on the basis of at least one of a plurality of parameters, wherein said plurality of parameters includes reference parameters pertaining to the frequency separation by the separation means and parameters pertaining to the encoding by the first encoding means.

20. The apparatus as claimed in claim 19, wherein the code string contains only partial information strings corresponding to a signal substantially encoded in said first encoding means and also contains information indicating the constitution of the code string.

21. The apparatus as claimed in claim 20, wherein information indicating the constitution of the code string indicates how many partial information strings are in the code string.

22. The apparatus as claimed in claim 19, wherein at least one of the reference parameters is information indicating how many spectral signals make up the tonal components separated by the frequency separation.

23. The apparatus as claimed in claim 19, wherein the first encoding means includes quantization means of quantizing said first signal and at least one of said reference parameters is information on the quantization step size for quantization.

24. The apparatus as claimed in claim 19, wherein the first encoding means includes quantization means for quantizing said first signal and at least one of said reference parameters is information indicating the number of spectral signals making up the respective tonal components separated by said frequency separation and information on the quantization step size for quantization.

25. An information recording medium having recorded thereon encoded signals generated by transmitting an encoded signal generated by transforming the input acoustical signal into frequency components, separating the frequency components into a first signal composed of tonal components and a second signal composed of noise spectra, and encoding said first and second signals, wherein a first code string corresponding to the first signal and a second code string corresponding to the second signal are recorded separately from each other, said first code string including partial information strings grouped so as to have common values on the basis of at least one of a plurality of parameters, wherein said plurality of parameters includes reference parameters pertaining to the frequency separation and parameters pertaining to the encoding of the first signal.

26. The information recording medium as claimed in claim 25, wherein the code string contains only partial information strings corresponding to a signal substantially encoded in said first encoding and also contains information indicating the constitution of the code string.

27. The information recording medium as claimed in claim 25, wherein the code string contains only partial information strings corresponding to a signal substantially encoded in said first encoding and also contains information indicating the constitution of the code string.

28. The information recording medium as claimed in claim 25, wherein the first encoding includes quantization of said first signal and at least one of said reference parameters is information on the quantization step size for quantization.

29. The information recording medium as claimed in claim 25, wherein the first encoding includes quantization of said first signal and at least one of said reference parameters is information indicating the number of spectral signals making up the respective tonal components separated by said separation and information on the quantization step size for quantization.

30. The information recording medium as claimed in claim 25, wherein information indicating the constitution of the code string indicates how many partial information strings are in the code string.

31. An apparatus for decoding a code string composed of encoded signals, comprising
first decoding means for decoding an encoded signal corresponding to a first signal made up of tonal components for generating first decoded signals by way of first decoding,
second decoding means for decoding an encoded signal corresponding to a second signal made up of noise spectra for generating second decoded signals by way of second decoding, and restoring means for synthesizing said first and second decoded signals for restoring an original signal,
said first decoding means or said restoring means employing a sole parameter for decoding or restoring.

32. The apparatus as claimed in claim 31, wherein code string contains only partial information strings corresponding to a signal substantially encoded in said first encoding and also contains information indicating the constitution of the code string.

33. The apparatus as claimed in claim 32, wherein information indicating the constitution of the code string indicates how many partial information strings are in the code string.

34. The apparatus as claimed in claim 31, wherein the sole parameter is information indicating how many spectral signals make up each tonal component.

35. The apparatus as claimed in claim 31, wherein the first decoding means includes inverse quantization means of inverse—quantizing said first signal and at least one of said reference parameters is information on the quantization step size for inverse quantization by the inverse quantization means.

36. The apparatus as claimed in claim 31, wherein the first decoding means includes inverse quantization means of inverse—quantizing said encoded signal and at least one of said reference parameters is information indicating the number of spectral signals making up the respective tonal components and information on the quantization step size for inverse quantization by the inverse quantization means.

* * * * *